(12) United States Patent
Lin

(10) Patent No.: US 10,997,297 B1
(45) Date of Patent: May 4, 2021

(54) VALIDATING FIRMWARE FOR DATA STORAGE DEVICES

(71) Applicant: Western Digital Technologies, Inc., San Jose, CA (US)

(72) Inventor: Tino Lin, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/929,181

(22) Filed: Dec. 6, 2019

(51) Int. Cl.
| | |
|---|---|
| *G06F 21/57* | (2013.01) |
| *G06F 8/65* | (2018.01) |
| *H04L 9/08* | (2006.01) |
| *H04L 9/06* | (2006.01) |
| *H04L 9/30* | (2006.01) |

(52) U.S. Cl.
CPC .............. *G06F 21/572* (2013.01); *G06F 8/65* (2013.01); *G06F 21/575* (2013.01); *H04L 9/0631* (2013.01); *H04L 9/0819* (2013.01); *H04L 9/30* (2013.01); *G06F 2221/033* (2013.01)

(58) Field of Classification Search
CPC ........ G06F 21/572; G06F 21/575; G06F 8/65; G06F 2221/033; H04L 9/0819; H04L 9/30; H04L 9/0631
USPC ........................................................ 713/191
See application file for complete search history.

(56) References Cited

U.S. PATENT DOCUMENTS

| | | |
|---|---|---|
| 7,055,148 B2 | 5/2006 | Marsh et al. |
| 7,089,547 B2 | 8/2006 | Goodman et al. |
| 7,330,982 B1 | 2/2008 | Mehr |
| 7,752,676 B2 | 7/2010 | Hartung et al. |
| 7,849,514 B2 | 12/2010 | Usov et al. |
| 8,214,653 B1* | 7/2012 | Marr ........................ G06F 8/65 713/189 |
| 8,300,831 B2 | 10/2012 | Kahler et al. |
| 8,353,053 B1 | 1/2013 | Chebiyyam |
| 8,494,170 B2 | 7/2013 | Kahler et al. |
| 8,522,322 B2 | 8/2013 | Wishman et al. |
| 8,560,823 B1 | 10/2013 | Aytek et al. |
| 8,661,259 B2 | 2/2014 | Yocom-Piatt et al. |

(Continued)

FOREIGN PATENT DOCUMENTS

| | | |
|---|---|---|
| CN | 104636688 A | 5/2015 |
| WO | 2009110140 A1 | 9/2009 |

OTHER PUBLICATIONS

U.S. Appl. No. 15/929,101, filed Feb. 5, 2019, Vinod Sasidharan.

(Continued)

*Primary Examiner* — Badrinarayanan Champakesan
(74) *Attorney, Agent, or Firm* — Patent Law Works LLP

(57) ABSTRACT

This disclosure relates to a storage device comprising non-volatile storage and a controller. The non-volatile storage may comprise a firmware image, a known data pattern (KDP) in plaintext, and an encrypted KDP. The controller may be coupled to the non-volatile storage, and may be configured to update the firmware image of the non-volatile storage. For this update, the controller may first receive a symmetric key from a host by way of a public key encryption process. Next, the controller may decrypt the encrypted KDP using the symmetric key. If the decrypted KDP matches the KDP in plaintext, the symmetric key may be validated and the firmware image update may be downloaded. The firmware image update may then replace the firmware image in non-volatile storage.

20 Claims, 8 Drawing Sheets

(56) References Cited

U.S. PATENT DOCUMENTS

| | | | |
|---|---|---|---|
| 8,812,854 B2 | 8/2014 | Shah et al. | |
| 9,256,744 B2 | 2/2016 | Hsu | |
| 9,734,339 B2 | 8/2017 | Jeansonne et al. | |
| 9,792,439 B2 | 10/2017 | Colnot | |
| 9,853,811 B1 | 12/2017 | Levy et al. | |
| 9,900,325 B2 | 2/2018 | Semenko et al. | |
| 9,979,703 B2* | 5/2018 | Warnez | G06F 8/65 |
| 2003/0217270 A1* | 11/2003 | Nakayama | G06Q 20/341 |
| | | | 713/172 |
| 2004/0076043 A1 | 4/2004 | Boals et al. | |
| 2004/0107349 A1* | 6/2004 | Sasselli | H04L 9/0891 |
| | | | 713/176 |
| 2004/0198392 A1* | 10/2004 | Harvey | H04L 63/20 |
| | | | 455/456.1 |
| 2006/0143600 A1 | 6/2006 | Cottrell et al. | |
| 2009/0241103 A1 | 9/2009 | Pennisi et al. | |
| 2009/0327741 A1 | 12/2009 | Zimmer et al. | |
| 2011/0087872 A1* | 4/2011 | Shah | G06F 21/554 |
| | | | 713/2 |
| 2011/0258451 A1* | 10/2011 | Yang | H04W 12/35 |
| | | | 713/169 |
| 2011/0276807 A1* | 11/2011 | Shin | G06F 21/572 |
| | | | 713/189 |
| 2012/0079287 A1* | 3/2012 | Leclercq | G06F 21/575 |
| | | | 713/192 |
| 2012/0110343 A1 | 5/2012 | Bandic et al. | |
| 2013/0185564 A1* | 7/2013 | Jaber | G06F 21/572 |
| | | | 713/176 |
| 2013/0318357 A1* | 11/2013 | Abraham | G06F 21/565 |
| | | | 713/176 |
| 2014/0082373 A1* | 3/2014 | Colnot | G06F 21/572 |
| | | | 713/193 |
| 2014/0136856 A1* | 5/2014 | Flynn | G06F 9/4406 |
| | | | 713/193 |
| 2014/0164725 A1 | 6/2014 | Jang et al. | |
| 2015/0172255 A1* | 6/2015 | Warnez | H04W 12/04 |
| | | | 713/168 |
| 2015/0180840 A1* | 6/2015 | Jung | H04L 67/34 |
| | | | 713/150 |
| 2016/0012233 A1* | 1/2016 | Kawano | H04L 9/0825 |
| | | | 713/165 |
| 2017/0097830 A1 | 4/2017 | Ehrenberg et al. | |
| 2017/0134373 A1* | 5/2017 | Li | H04L 63/061 |
| 2017/0161505 A1* | 6/2017 | Campagna | G06F 9/45558 |
| 2017/0220404 A1* | 8/2017 | Polar Seminario | |
| | | | G06F 11/0736 |
| 2018/0188986 A1 | 7/2018 | Webster | |
| 2018/0336024 A1* | 11/2018 | Klische | H04L 9/3247 |
| 2019/0163910 A1* | 5/2019 | Moon | G06F 21/572 |
| 2019/0187971 A1* | 6/2019 | Wang | H04W 12/04 |
| 2019/0236279 A1* | 8/2019 | Depew | G06F 21/575 |
| 2019/0258589 A1* | 8/2019 | Kim | G06F 21/575 |
| 2019/0356529 A1* | 11/2019 | Gulati | G06F 21/10 |
| 2020/0004967 A1* | 1/2020 | Fu | G06F 21/57 |
| 2020/0021981 A1* | 1/2020 | Mondello | H04W 12/069 |
| 2020/0033167 A1* | 1/2020 | Sexton | G01K 13/00 |
| 2020/0084188 A1* | 3/2020 | Wysocki | G06F 21/10 |

OTHER PUBLICATIONS

U.S. Appl. No. 16/365,346, filed Mar. 26, 2019, Tino Lin.
"How to Set a Firmware Password on Your Mac", Aug. 28, 2013.
"Security Challenges in Embedded Designs", Rippel.
Ralp C. Merkle, Protocols for Public Key Cryptosystems, ELXSI International, Symposium on Security and Privacy, © 1980 IEEE, available at http://www.merkle.com/papers/Protocols.pdf, accessed on Sep. 19, 2019.
STMicroelectronics NV, Overview secure firmware install (SFI), Application Note, AN4992, available at https://www.st.com/content/ccc/resource/technical/document/application_note/group1/fb/aa/74/3f/a8/a9/49/a8/DM00355688/files/DM00355688.pdf/jcr:content/translations/en.DM00355688.pdf, accessed on Oct. 30, 2019. Page 6.

* cited by examiner

VALIDATING FIRMWARE FOR DATA STORAGE DEVICES

CROSS-REFERENCE TO RELATED APPLICATIONS

This application is related to U.S. patent application Ser. No. 16/365,346 entitled "SECURE FIRMWARE BOOTING" filed on Mar. 26, 2019, which is incorporated herein by reference in its entirety for all purposes. This application is related to U.S. patent application Ser. No. 16/365,346 entitled "METHOD TO UNLOCK A SECURE DIGITAL MEMORY DEVICE LOCKED IN A SECURE DIGITAL OPERATIONAL MODE" filed on Feb. 5, 2019, which is incorporated herein by reference in its entirety for all purposes.

BACKGROUND

Devices such as storage device bridges, hard disk drives, and solid-state drives are vulnerable to malicious firmware logic tampering. A storage device bridge is a digital storage system attached to either a server or workstation without an intervening storage network or to a host/server/workstation by way of a network. A direct-attached storage device may comprise a data storage device (for example enclosures holding a number of hard disk drives, solid state drives, or combination thereof) connected directly to a computer through a host bus adapter (HBA), without a network device (such as a hub, switch, or router) therebetween. Protocols used by direct-attached storage devices include Advanced Technology (AT) Attachment (ATA), Serial AT Attachment (SATA), External Serial AT Attachment (eSATA), Small Computer system Interface (SCSI), Serial Attached SCSI (SAS), Universal Serial Bus (USB), and Firewire (IEEE 1394).

Conventional techniques utilized to prevent firmware logic tampering include the use of digital signatures for firmware images, the use of encryption and decryption keys, and firmware validation processes executed during power-on-reset and firmware downloading. There is, however, a need for improvements over those conventional approaches to protect firmware from tampering, and for recovering from situations involving tampered/corrupted firmware.

BRIEF SUMMARY

This disclosure relates to a storage device comprising non-volatile storage and a controller. The non-volatile storage may comprise a firmware image, a known data pattern (KDP) in plaintext, and an encrypted KDP. The controller may be coupled to the non-volatile storage and may be configured to update the firmware image of the non-volatile storage. For this update, the controller may first receive a symmetric key from a host by way of a public key encryption process. Next, the controller may decrypt the encrypted KDP using the symmetric key. If the decrypted KDP matches the KDP in plaintext, the symmetric key may be validated, and the firmware image update may be downloaded. The firmware image update may then replace the firmware image in non-volatile storage.

This disclosure further relates to a storage device bridge. This bridge may comprise a storage bus coupled to one or more storage media. The bridge may further comprise embedded non-volatile memory. This non-volatile memory may include a firmware image, a known data pattern (KDP), an encrypted KDP, and a public key. The storage device bridge may comprise means for receiving a symmetric key from a host over a secure communication channel for obtaining a firmware image update encrypted using the symmetric key. The bridge may also comprise means for decrypting the encrypted KDP using the symmetric key and validating the symmetric key in response to the decrypted KDP matching the known data pattern. The bridge may comprise means for downloading and decrypting the firmware image update in response to validating the symmetric key. Finally, the bridge may comprise means for replacing the firmware image with the firmware image update.

This disclosure includes a method. The method starts with manufacturing a storage device comprising a known data pattern (KDP) and an encrypted KDP and a firmware image, the storage device having a public key and the encrypted KDP encrypted using an AES key. Next, a firmware image update may be generated. In certain embodiments, the firmware image update may be encrypted using the AES key. In such embodiments, the method proceeds by next encrypting the firmware image update using the AES key. Next, the public key may be received from the storage device to initiate a firmware image update download. The AES key may be encrypted using the public key. Then, the encrypted AES key may be sent to the storage device. The storage device may be configured to decrypt the AES key using a private key exclusive to the storage device and decrypt the encrypted KDP to validate the AES key. The firmware image update (which is now encrypted using the AES key) may next be sent to the storage device by dividing the firmware image update into packets. The storage device may be configured to store each packet in non-volatile storage of the storage device. In one embodiment, the storage device decrypts the firmware image update using the AES key once all packets are received and stored. In another embodiment, the storage device may decrypt each packet of the firmware image update using the AES key. The storage device may then boot the firmware image update during a subsequent booting event.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
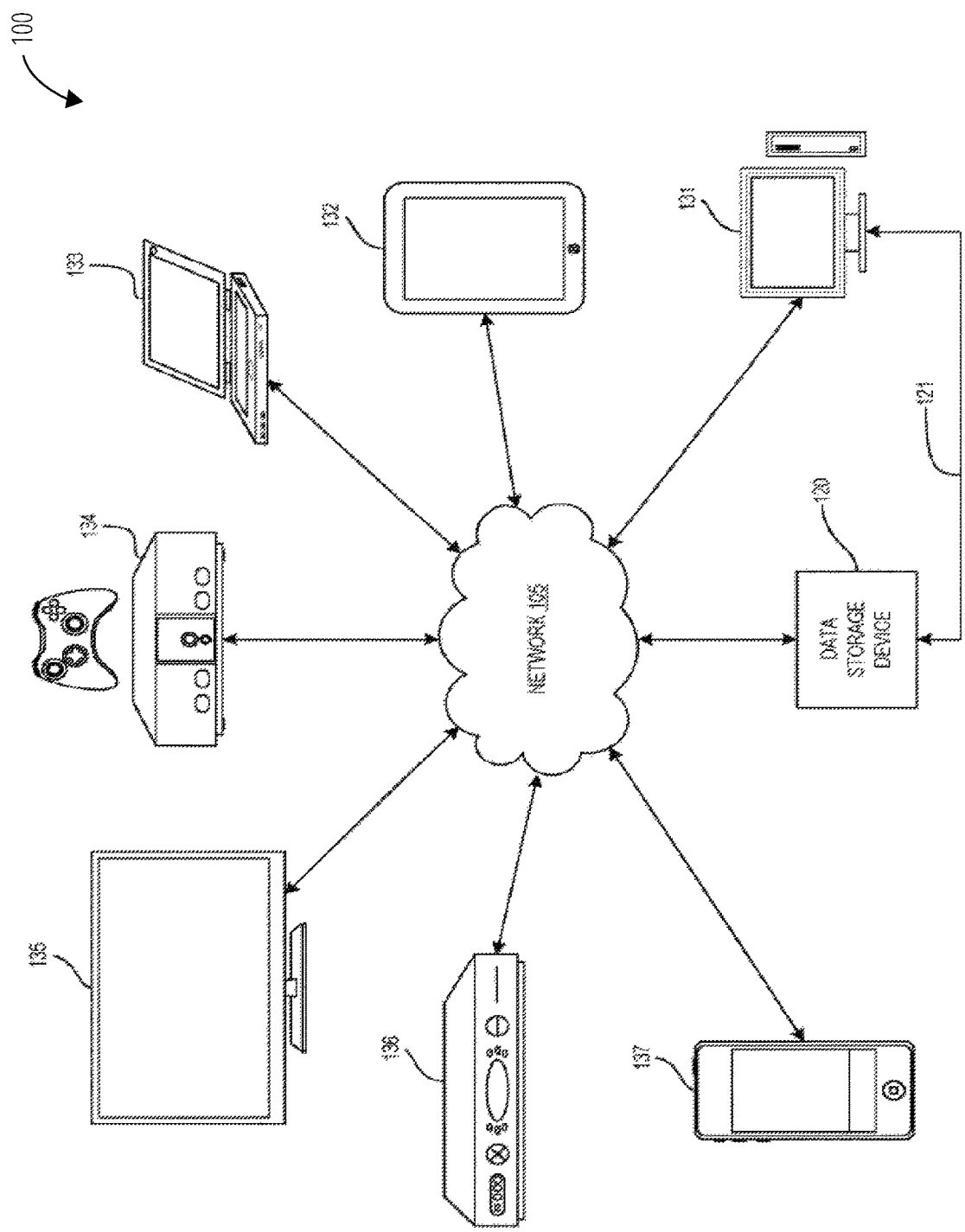
FIG. 1 is a diagram of a data storage system, according to an embodiment.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claimed invention. Disclosed herein are example implementations, configurations, and/or embodiments relating to validating firmware and/or other software for electronic devices, such as data storage devices. "Firmware" refers to software logic embodied as processor-executable instructions stored on volatile memory media and/or non-volatile memory media. Firmware may also be used as a shorthand reference to 'firmware image'. "Firmware image" refers to a set of firmware organized into a set of organized data, such as a file. Firmware image typically refers to firmware configured for use and operation within a computing device and stored on a storage media. In certain embodiments, the firmware image conforms to a predefined firmware image layout that is defined by a manufacturer, a consortium of manufacturers, an industry standard, or the like. "Firmware image update" refers to a version of a firmware image configured or designed to replace an existing firmware image. Typically, the existing firmware image is being used by an electronic device and a user or manufacturer desires to replace the existing image with the firmware image update. A firmware image update may be created and provided to a user for a variety of reasons, including, to fix an error or bug, add new features, support different hardware, firmware, or software of other components, and the like.

"Software" refers to logic implemented as instructions for controlling a programmable device or component of a device (e.g., a programmable processor, controller). Software can be source code, object code, executable code, machine language code. Unless otherwise indicated by context, software shall be understood to mean the embodiment of said code in a machine memory or hardware component, including "firmware" and micro-code. "Instructions" refers to symbols representing commands for execution by a device using a processor, microprocessor, controller, interpreter, or other programmable logic. Broadly, 'instructions' can mean source code, object code, and executable code. 'instructions' herein is also meant to include commands embodied in programmable read-only memories (EPROM) or hard coded into hardware (e.g., 'micro-code') and like implementations wherein the instructions are configured into a machine read-only memory or other hardware component at manufacturing time of a device. "Controller" refers to any hardware, device, component, element, circuitry, or circuit configured to manage and control another software, hardware, firmware, device, apparatus, or logic unit, component, device, or component.

Data storage devices/systems may provide one or more computing devices with file-level data storage. One example of a storage device/system may be a direct-access storage (DAS) device. The DAS device may be coupled to a computing device (e.g., a laptop computer, a desktop computer, etc.) via a connection cable (e.g., a Thunderbolt cable, an external serial advanced technology attachment (eSATA) cable, a universal serial bus (USB) cable, etc.) coupled to a direct-access interface (e.g., a communication interface such as USB 2.X, USB 3.X, Thunderbolt, eSATA, etc.) of the DAS device. A DAS device may provide a convenient mechanism for transferring data between computing devices, increasing the storage capacity (e.g., increasing the storage space) of a computing device, and/or providing increased data security through data redundancy. Another example of a storage device/system may be a network-access storage (NAS) device. A NAS device may be coupled to a network via a network-access interface (e.g., a network interface or a communication interface such as Ethernet, 802.11 (Wi-Fi), etc.). A NAS device may provide file-level data storage over a network (e.g., a computer network), where the stored data is accessible to a group of clients. For example, a NAS device may include hardware, software, or a combination of such elements, configured such that the NAS device operates as a file server. NAS devices/systems can provide a convenient mechanism for sharing data among multiple computers and/or remotely accessing data stored on the NAS devices/systems. As compared to traditional file servers, benefits of NAS devices/systems may include the ability to access data from various locations (e.g., remote locations), faster data access, easier administration, and/or simpler configuration.

Certain embodiments disclosed herein provide the ability to validate firmware (and/or other software) for an electronic device (such as a storage device) when initiating operation of the electronic device (e.g., booting the electronic device) and/or when updating/installing the firmware on the electronic device.

FIG. 1 is a diagram of a data storage system 100, according to an embodiment. In the data storage system 100, a storage device 120 may be communicatively coupled to one or more client devices (e.g., one or more computing devices) in order to provide file-based data storage services to the one or more client devices. Types of client devices that may have access to the storage device 120 may include, but are not limited to, phones 137 (e.g., smart phones, cellular phones, etc.), cable set-top boxes 136, smart televisions (TVs) 135, video game consoles 134, laptop computers 133, tablet computers 132, desktop computers 131, wearable computers and/or other types of computing devices. In one embodiment, the storage device 120 may be an external standalone storage device. For example, the storage device 120 may be a storage device that is not located within a computing device (e.g., not within a case or housing of a computing device). In another example, the storage device 120 may be a storage device that may provide access to data without being directly coupled to a computing device (e.g., may be a NAS device). The client devices may also be referred to as host systems. In one embodiment, the storage device 120 may be a portable storage device. The portable storage device may lack a power source (e.g., may lack a battery and/or an alternating current (AC) adaptor) and may receive power from the client devices (e.g., host systems).

The storage device 120 may provide various client devices (e.g., phones 137, cable set-top boxes 136, smart TV's 135, video game consoles 134, laptop computers 133, tablet computers 132, desktop computers 131) with access to various types of user data stored on the storage device 120. The storage device 120 may also allow users to store various types of user data on the storage device 120. The storage device 120 may comprise magnetic media, hard disk media, and/or solid-state media.

While certain description herein refers to solid state memory generally, it is understood that solid state memory may comprise one or more of various types of solid state non-volatile memory devices such as flash integrated circuits, Chalcogenide random-access memory (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, electrically erasable programmable read-only memory (EEPROM), Ferroelectric Memory (FeRAM), Magnetoresistive RAM (MRAM), other discrete non-volatile memory (NVM) chips, or any combination thereof. "non-volatile memory" refers to a type of storage or memory device, component, or apparatus that retains stored data when power is turned off or removed from the non-volatile memory.

"Non-volatile memory media" refers to any hardware, device, component, element, or circuit configured to maintain an alterable physical characteristic used to represent a binary value of zero or one after a primary power source is removed. Examples of the alterable physical characteristic include, but are not limited to, a threshold voltage for a transistor, an electrical resistance level of a memory cell, a current level through a memory cell, a magnetic pole orientation, a spin-transfer torque, and the like.

The alterable physical characteristic is such that, once set, the physical characteristic stays sufficiently fixed such that when a primary power source for the non-volatile memory media is unavailable the alterable physical characteristic can be measured, detected, or sensed, when the binary value is read, retrieved, or sensed. Said another way, non-volatile memory media is a storage media configured such that data stored on the non-volatile memory media is retrievable after a power source for the non-volatile memory media is removed and then restored. Non-volatile memory media may comprise one or more non-volatile memory elements, which may include, but are not limited to: chips, packages, planes, die, and the like.

Examples of non-volatile memory media include but are not limited to: ReRAM, Memristor memory, programmable metallization cell memory, phase-change memory (PCM, PCME, PRAM, PCRAM, ovonic unified memory, chalcogenide RAM, or C-RAM), NAND FLASH memory (e.g., 2D NAND FLASH memory, 3D NAND FLASH memory), NOR FLASH memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like.

While the non-volatile memory media is referred to herein as "memory media," in various embodiments, the non-volatile memory media may more generally be referred to as non-volatile memory. Because non-volatile memory media is capable of storing data when a power supply is removed, the non-volatile memory media may also be referred to as a recording media, non-volatile recording media, storage media, storage, non-volatile memory, volatile memory medium, non-volatile storage medium, non-volatile storage, or the like.

In certain embodiments, data stored in non-volatile memory media is addressable at a block level which means that the data in the non-volatile memory media is organized into data blocks that each have a unique logical address (e.g., LBA). In other embodiments, data stored in non-volatile memory media is addressable at a byte level which means that the data in the non-volatile memory media is organized into bytes (8 bits) of data that each have a unique address, such as a logical address. One example of byte addressable non-volatile memory media is storage class memory (SCM).

"Storage media" refers to any physical media organized and configured to store one or more bits of data. In one embodiment, storage media refers to physical storage cells and/or memory cells used in volatile memory media. In another embodiment, storage media refers to physical storage cells and/or memory cells used in non-volatile memory media.

"Storage device" refers to any hardware, system, subsystem, circuit, component, module, non-volatile memory media, hard disk drive, storage array, device, or apparatus configured, programmed, designed, or engineered to store data for a period of time and retain the data in the storage device while the storage device is not using power from a power supply. Examples of storage devices include, but are not limited to, a hard disk drive, FLASH memory, MRAM memory, a Solid-State storage device, Just a Bunch Of Disks (JBOD), Just a Bunch Of Flash (JBOF), an external hard disk, an internal hard disk, and the like.

With further reference to FIG. 1, the storage device 120 (e.g., magnetic disk drive, hybrid hard drive, solid-state drive, etc.) may include a controller (not shown in FIG. 1) configured to receive data commands and to execute such commands in one or more non-volatile storage components of the storage device 120. Such commands may include data read/write commands and the like. The controller may be configured to receive data commands from a communication interface (e.g., a network-access interface and/or a direct-access interface) residing on a computing device (e.g., a host system). Data commands may specify a block address in the storage device 120, and data may be accessed/transferred based on such commands. The data commands may also be referred to as data access requests.

The storage device 120 may be configured to store data in one or more magnetic recording disks and/or the solid-state memory devices/arrays. In an embodiment, the storage device 120 may comprise a cable box, a backup disk drive, a media storage unit, a streaming media device, a digital camera, or any other electronic device which may store data that may need to be accessed directly or wirelessly.

In certain embodiments, the storage device 120 may store data received from a client device such that the storage device 120 acts as data storage for the client device. To facilitate this function, the storage device 120 may implement a logical interface. The logical interface can present to the client device memory as a set of logical addresses (e.g., sequential/contiguous addresses) where data may be stored. Internally, the controller may map logical addresses to various physical memory addresses in the non-volatile memory of the storage device 120. Mapping data indicating the mapping of logical addresses to physical memory addresses may be maintained in the storage device 120.

In one embodiment, the storage device 120 may be a DAS device. The DAS device may be directly coupled to a client device (e.g., a desktop computer 131) via a connection cable 121. The connection cable 121 may be coupled to a communication interface (e.g., a USB 2.X interface, a USB 3.X interface, a Thunderbolt interface, etc.) of the DAS device (e.g., storage device 120). In another embodiment, the storage device 120 may also be a NAS device. The NAS device may also be coupled to the client devices 131-137 via a network 105. The NAS device may be coupled to the network 105 via a network interface (e.g., an Ethernet interface, an 802.11 (Wi-Fi) interface, etc.). Each of the client devices 131-137 may also be coupled to the network 105 via a network interface. In one embodiment, network 105 may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof. Although FIG. 1 illustrates the storage device 120 as being coupled to the client device 131, the storage device may be coupled to any number of the client devices 131-137 via one or more connection cables in other embodiments.

In one embodiment, the storage device 120 may receive data access requests from the client devices 131-137 via the communication interface (e.g., a direct-access interface such as USB 2.X, USB 3.X, Thunderbolt) and/or via the network interface (e.g., Ethernet, 802.11, etc.). The data access requests may be messages, commands, and/or requests to access data on the storage device. For example, a data access request may indicate that a computing device wants to read data from the storage device 120. In another example, a data access request may indicate that a computing device wants to write data to the storage device 120.

Data storage devices, such as storage device 120, may use firmware (and/or other software) to perform various operations and/or functions. For example, firmware may be used to control various low-level functions/operations of the storage device 120. In another example, the firmware may be used to operate the storage device 120 (e.g., to allow the storage device 120 to communicate with the client devices, to read/write data from/to a storage medium, etc.). The firmware (and/or other software) may be periodically updated to maintain the storage device 120 and/or to improve the operation of the storage device 120. For example, the firmware may be updated to resolve issues (e.g., errors) encountered by users of the storage device 120. In another example, the firmware may be updated to add new functionalities/capabilities to the storage device 120.

When updating the firmware of the storage device 120 and/or when initiating operation of the storage device 120 (e.g., booting the storage device 120), it may be useful to prevent the storage device 120 from using unauthorized or invalid firmware. For example, a user (e.g., a hacker or a malicious user) may attempt to install unauthorized/invalid firmware (e.g., firmware that is not authentic and/or is not provided by the manufacturer of the storage device 120). Using the unauthorized/invalid firmware may cause the storage device 120 to operate improperly and/or may result in security issues when the storage device 120 is used. For example, the unauthorized/invalid firmware may allow unauthorized users to access data stored on the storage device 120. In another example, the unauthorized/invalid firmware may cause errors to occur when the storage device 120 accesses data, which may corrupt the data stored on the storage device.

Figure 2:
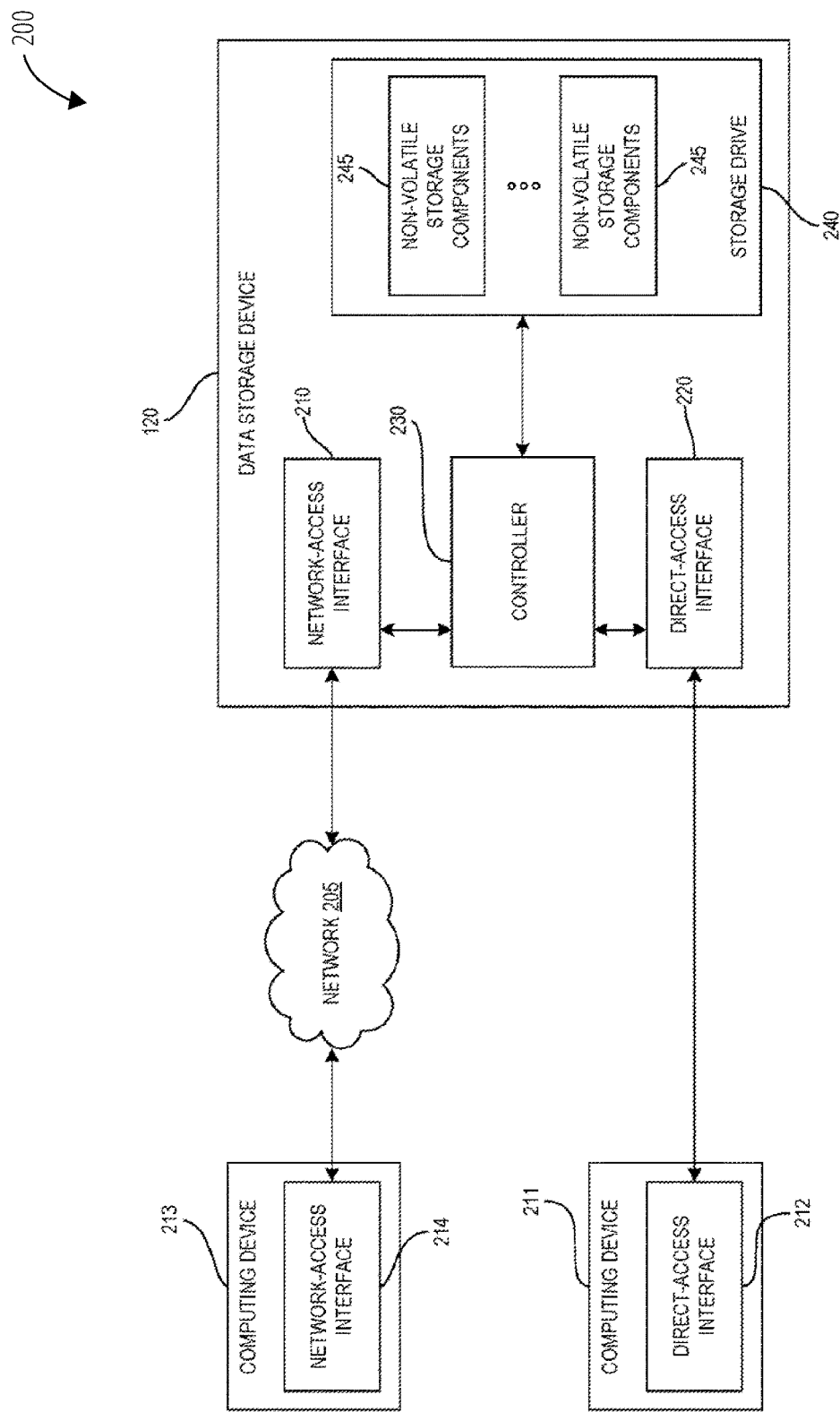
FIG. 2 illustrates a data storage system 200 in accordance with one embodiment.

FIG. 2 is a diagram of a data storage system 200 according to an embodiment. The data storage system 200 includes a computing device 211, a computing device 213, a connection cable, and a data storage device 120. Each of the computing devices 211 and 213 may be a laptop computer, a desktop computer, a server computer, a tablet computer, a smart phone, a set-top box, a smart TV, a video game console, etc. The computing devices 211 and 213 may also be referred to as host systems. The data storage device 120 may include a controller 230, a direct-access interface 220 (e.g., USB 2.X, USB 3.X, Thunderbolt, eSATA, etc.), a network-access interface 210 (e.g., Ethernet, Wi-Fi, etc.), and non-volatile storage components 245. The controller 230 may be a processing device, such as a field-programmable gate array (FPGA), an application-specific integrated circuit (ASIC), a processor, a central processing unit (CPU), a system-on-chip (SoC), etc. In one embodiment, the non-volatile storage components 245 may include non-volatile magnetic media and/or solid-state memory, such as NAND flash. The controller 230 may provide overall control for the data storage device 120. In one embodiment, the data storage device 120 may be a portable data storage device. The portable data storage device may lack a power source (e.g., may lack a battery and/or an AC adaptor) and may receive power from the computing device 211 (e.g., a host system).

In certain embodiments, the data storage device 120 may be a hard disk drive. The non-volatile storage components 245 may include one or more disks, and the data storage device 120 may further include one or more heads (not shown) actuated radially over the disk(s) and a spindle motor for rotating the disk(s). Alternatively to, or in addition to, magnetic rotating media, solid-state memory and/or other non-volatile memory such as MRAM and/or phase change memory may be used. In certain embodiments, the data storage device 120 may be, for example, a hybrid hard drive including both magnetic media and solid-state media (e.g., the non-volatile storage components 245 may include both magnetic disks and solid-state media/memory). In one embodiment, the non-volatile storage components 245 may be coupled to the controller via one or more serial bus connectors. Examples of serial bus connectors include, but are not limited to, serial ATA (SATA) connectors, peripheral component interconnect express (PCie) connectors, and SATA Express connectors. In one embodiment, the data storage device 120 may be external standalone data storage devices (e.g., NAS devices/drives, portable external hard drives, etc.). In another embodiment, the data storage device 120 may be a portable data storage device. For example, the data storage device 120 may be a portable external hard drive. In another embodiment, data storage device 120 may receive power from the computing device 211 via a connection cable and the direct-access interfaces 212 and 220. For example, the data storage device 120 may not include a power source (e.g., a battery, a power adaptor, etc.) and may operate using power (e.g., voltage, current, etc.) received from the computing device 211 (e.g., a host system).

The controller 230 may receive data access requests (e.g., data and storage access commands) from a direct-access interface 212 (e.g., a USB interface, a Thunderbolt interface) of the computing device 211. Data access requests communicated by the direct-access interface 212 may include write and read commands issued by the computing device 211. The data access requests may specify a logical block address (LBA), or range of LBAs, in the data storage device 120, and the controller 230 may execute the received data access requests in the non-volatile storage components 245. The controller 230 may also receive data access requests from a network-access interface 214 (e.g., a communication interface such as an Ethernet interface, a Wi-Fi interface, etc.) of the computing device 213. The controller 230 may determine an LBA and/or a range of LBAs in the data storage device 120 based on the data access requests and may execute the received data access requests in the non-volatile storage components 245. In a hybrid hard drive, data may be stored in a magnetic media storage component as well as non-volatile solid-state memory.

The data storage device 120 may store data received from the computing devices 211 and 213, such that the data storage device 120 acts as memory for the computing devices 211 and 213. To facilitate this memory function, the controller 230 may implement a logical interface. The logical interface may present to the computing devices 211 and 213 the memory of the data storage device 120 as a set of logical addresses (e.g., contiguous addresses) where data can be stored. The controller 230 may map logical addresses to various physical memory addresses in the non-volatile storage components 245 and/or other memory module(s).

The data storage device 120 may be configured to implement data redundancy, wherein user data stored in the non-volatile storage components 245 is maintained in one or more internal and/or external drives. For example, the controller 230 may include a data redundancy management module (not shown in FIG. 2) configured to implement redundancy functionality. The data redundancy management module may implement redundant array of independent disks (RAID) technology, wherein the non-volatile storage components 245 includes a plurality of internal drives, disks, or other data storage partitions combined into a logical unit for the purposes of data redundancy and performance improvement. In addition, or alternatively, the data redundancy management module may be configured to implement RAID using one or more internal memory modules in combination with one or more external memory devices, as discussed in greater detail below.

For RAID purposes, the non-volatile storage components 245 may include an array of one or more storage devices, such as hard disks or other memory modules that are configured to store user data. In certain embodiments, such internal memory modules/disks may be each directly coupled to the controller 230 to provide a high bandwidth interface for reading and writing user data. The non-volatile storage components 245 may include one or more additional memory modules configured to store parity information.

The controller 230 may be configured to divide and replicate user data among the physical RAID memory modules, providing storage virtualization. The array may be accessed by the computing devices 211 and 213 as a single drive. Data may be distributed across the RAID memory modules/drives according to any desirable or practical RAID level, depending on the level of redundancy and/or performance desired. For example, the data storage device 120 may be configured to implement RAID 0, RAID 1, RAID 5, RAID 6, RAID 10, other RAID technology, or other erasure coding technology, depending on data reliability, availability, performance and/or capacity considerations or requirements.

The computing device 211 may be coupled to the data storage device 120 via a connection cable. The connection cable may directly connect the computing device 211 and the data storage device 120. The connection cable may use one or more communication interfaces (such as a bus interface) and/or protocols that may allow the computing device 211 to communicate with the data storage device 120. The direct-access interfaces 212 and 220 may be USB interfaces, Thunderbolt interfaces, serial attached SCSI (SAS), eSATA interfaces, etc.

In one embodiment, the connection cable may include one or more data lines (e.g., one or more wires, pins, etc.) that allow the computing device 211 to communicate data with the data storage device 120. For example, the connection cable may include data lines (not shown in FIG. 2) that the computing device 211 may use to read data from and/or write data to the data storage device 120. The computing device 211 may communicate data to and from the data storage device using the direct-access interface 212 (e.g., via the direct-access interface 212). In another embodiment, the computing device 211 may provide an input voltage to the data storage device 120, and the data storage device 120 may use the input voltage to operate one or more components of the data storage device 120 (e.g., the controller 230, the non-volatile storage components 245, a motor, etc.). The connection cable may include one or more voltage lines (e.g., wires, pins, etc.) that may receive the input voltage from the computing device 211 via the direct access interface 212. The one or more voltage lines may provide the input voltage (received from the computing device 211) to the data storage device 120 via the direct access interface 220. In a further embodiment, the data storage device 120 may be coupled to a separate power source (e.g., may be coupled to a battery, to an AC adaptor, to a wall outlet, etc.).

In one embodiment, the connection cable may include a bridge unit (not shown in FIG. 2). For example, the connection cable may include a USB bridge, a Thunderbolt bridge, or other type of bridge. The bridge unit may translate between two different types of communication interfaces and/or protocols. For example, if a connected storage device communicates in a first protocol, but not a second protocol, the bridge unit may translate the second protocol to the first protocol, or vice versa.

The computing device 213 may be communicatively coupled to the data storage device 120 via a network 205 (e.g., one or more of a Wi-Fi network, a LAN, a cellular network, etc.). The computing device 213 may send data (e.g., files, images, movies, etc.) and/or data access requests to the data storage device 120 via the network-access interface 214 (e.g., a communication interface, an Ethernet interface, a Wi-Fi interface, etc.) and the network 205. The data storage device 120 may receive the data and/or data access requests from the computing device 213 via the network-access interface 210.

In one embodiment, the data storage device 120 may include an encryption module (e.g., software, hardware, firmware or a combination thereof) that may encrypt/decrypt data (e.g., files) stored on the non-volatile storage components 245. For example, the encryption module may use encryption keys and/or encryption functions/algorithms to encrypt and/or decrypt data. In another embodiment, the data storage device 120 may include various sensors such as a compass (e.g., a magnetometer), a gyroscope, an accelerometer, a global positioning system (GPS) sensor, a temperature sensor (e.g., a thermometer), etc.

As discussed above, it may be useful to prevent the data storage device 120 from using unauthorized/invalid firmware. Using the unauthorized/invalid firmware may cause the data storage device 120 to operate improperly and/or may result in security issues when the data storage device 120 is used. A key (e.g., an encryption key, a cryptographic key, etc.) may be used to validate firmware (e.g., may be used to determine whether firmware is authentic). The key may be stored in a memory, such as a one-time programmable (OTP) memory. One having ordinary skill in the art understands that other types of memory, such as secure memory, may be used to store the key. The OTP memory may generally be included as part of the controller 230. Including the OTP memory in the controller 230 may increase the size, cost, and/or complexity of the controller 230.

In one embodiment, the controller 230 may determine whether a firmware image (for booting the data storage device and/or for operating the data storage device) has been validated by the storage drive 240. For example, the controller 230 may send a request (e.g., a message, a command, etc.) to validate the firmware image, to the storage drive 240. The controller 230 may boot (e.g., may begin/initiate operation of) the data storage device 120 using the firmware image if the firmware image has been validated by the storage drive 240, as discussed in more detail below. The controller 230 may also store the firmware image in a memory (e.g., a FLASH memory) if the firmware image has been validated by the storage drive 240, as discussed in more detail below. If the firmware has not been validated by the storage drive 240, the controller 230 may refrain from booting the data storage device 120, as discussed in more detail below. For example, the controller 230 may refrain from booting the data storage device 120 (e.g., may not boot the data storage device 120) if the firmware image is invalid and/or if the storage drive 240 is unable to validate the firmware image. The controller 230 may also refrain from storing the firmware image in the memory if the firmware image is invalid and/or if the storage drive 240 is unable to validate the firmware image.

In one embodiment, the storage drive 240 may receive a request to validate the firmware image, as discussed in more detail below. The storage drive 240 may determine whether the firmware image is valid based on a digital signature and a key (e.g., an encryption key, a cryptographic key, etc.), as discussed in more detail below. The storage drive 240 may transmit data (e.g., a value, a result, an alphanumeric string, etc.) to the controller 230 indicating whether the firmware image is valid, as discussed in more detail below.

Many storage drives have the ability to validate a firmware image of the storage drive (e.g., a storage drive firmware image). In one embodiment, the controller 230 may use this ability of the storage drive 240 (to validate firmware images) to validate a firmware image of the data storage device 120 (e.g., a data storage device firmware image). This may allow the OTP memory to be removed from the controller 230 which may decrease the size, cost, and/or complexity of the controller 230. This may also allow the controller 230 to offload the process of validating the data storage device firmware image to the storage drive 240, which may allow the controller 230 to operate more efficiently and/or perform other tasks, operations, functions, etc.

Figure 3:
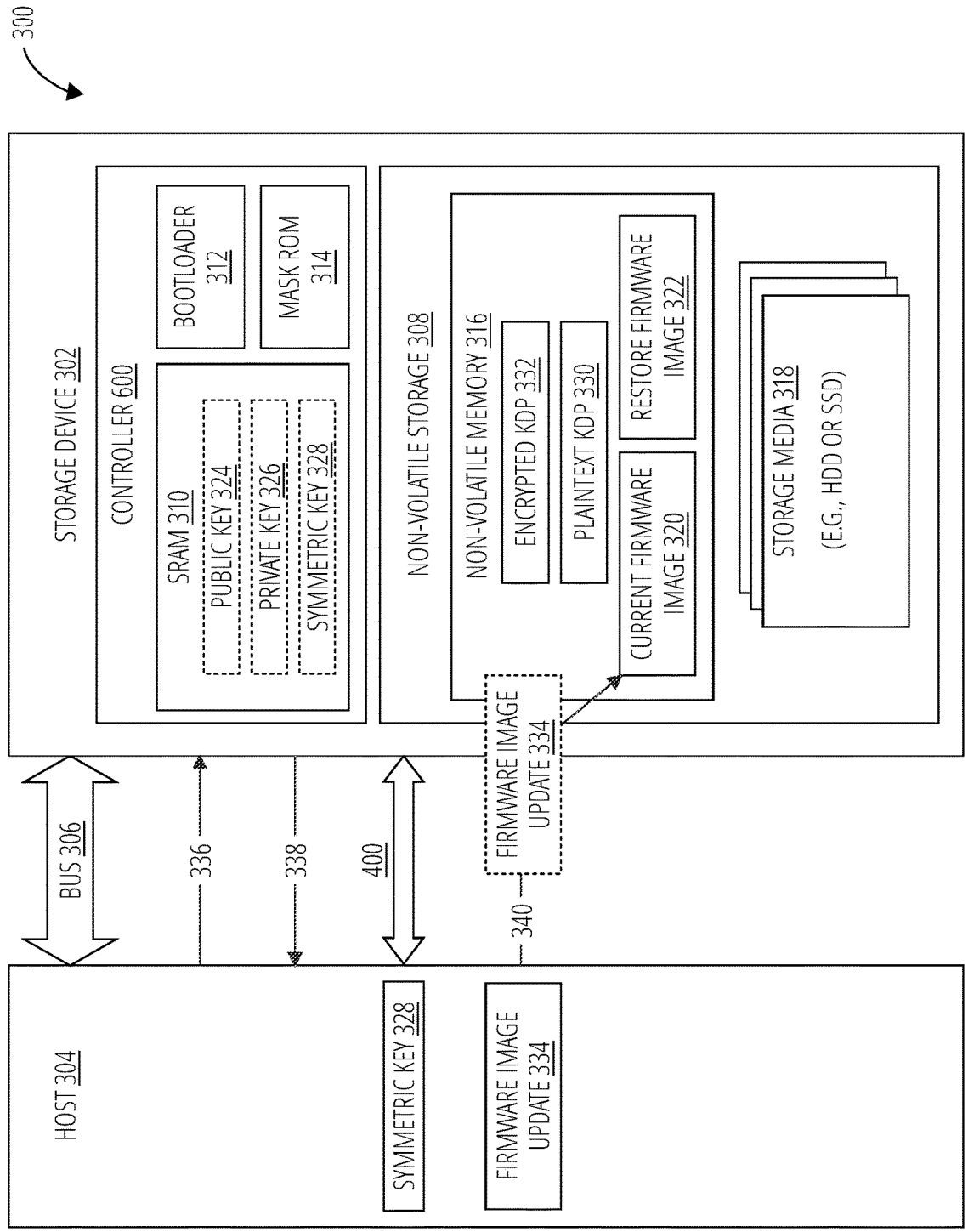
FIG. 3 illustrates a system 300 in accordance with one embodiment.

FIG. 3 illustrates a system 300 in accordance with one embodiment. The system 300 may comprise a storage device 302 coupled to a host 304 through a storage bus 306. The storage bus 306 may be a USB connection, a SATA connection, or another bus protocol suitable for communication between the storage device 302 and the host 304.

The storage device 302 may comprise a controller 600 coupled to non-volatile storage 308. The controller 600 of the storage device 302 may in some embodiments be a SCSI source node. The controller 600 may include an SRAM 310, a bootloader 312, and a mask ROM 314. The non-volatile storage 308 may include embedded non-volatile memory 316 and a storage media 318, such as a hard disk drive (HDD), a solid-state drive (SSD), or other readable, writable memory technology.

In certain embodiments, the Original Equipment Manufacturer (OEM) may store a firmware image in the non-volatile memory 316 when the storage device 302 is manufactured. This original firmware image is referred to herein as a current firmware image 320. Advantageously, in certain embodiments, the encrypted KDP 332 and plaintext KDP 330 are also stored in the non-volatile memory 316 when the device is manufactured. In this manner, the current firmware image 320, encrypted KDP 332, and plaintext KDP 330 are known to be from a trustworthy source.

"Plaintext" refers to any data, including binary files, in a form that can be viewed or used without requiring a key or other decryption device or mechanism. In relation to cryptography, plaintext also refers to unencrypted information pending input into cryptographic algorithms, such as encryption algorithms. ("plaintext" Wikipedia. Sep. 12, 2019. Edited, Accessed Nov. 13, 2019. https://en.wikipedia.org/wiki/plaintext.)

"Encryption" refers to the process of encoding a message or information in such a way that only authorized parties can access it and those who are not authorized cannot. Encryption does not itself prevent interference, but denies the intelligible content to a would-be interceptor. In an encryption scheme, the intended information or message, referred to as plaintext, is encrypted using an encryption algorithm—a cipher—generating ciphertext that can be read only if decrypted. ("encryption" Wikipedia. Nov. 13, 2019. Accessed Nov. 13, 2019. https://en.wikipedia.org/wiki/encryption.) "Encrypted KDP" refers to a known data pattern (KDP) that has been encrypted using a cryptographic (aka encryption) key. "Decrypted KDP" refers to a known data pattern (KDP) that has been decrypted using a cryptographic (aka encryption) key. The encryption key used to decrypt the KDP may be a symmetric key or an asymmetric key.

In some embodiments, a current firmware image 320 may be installed at a predefined location from which the storage device 302 will boot the firmware code at start-up, and a restore firmware image 322 may be installed in another location. This restore firmware image 322 may available to be booted from in a safe mode, when the controller 600 determines or suspects that a current firmware image 320 is compromised. In one embodiment, the controller 600 may copy the restore firmware image 322 to the current firmware image 320 location to replace a potentially compromised firmware image.

In accordance with this disclosure, the non-volatile memory 316 may also be manufactured by an Original Equipment Manufacturer (OEM) storing a known data pattern (KDP) in two forms: a plaintext KDP 330 and an encrypted KDP 332. "Known data pattern" refers to a set of data organized into a structure, form, pattern, or set of content such that the data pattern and/or the content of the data may be readily reviewed, compared and analyzed in relation to a test data pattern to determine whether the test data pattern matches, is equal to, or satisfies a condition in relation to the known data pattern (KDP). In certain embodiments, a known data pattern is used in cryptography to validate that the sender of a message is in fact who or what they proport to be.

For example, in a cryptography context, the known data pattern may be stored in both an encrypted format and in a plaintext format. In such an example, the decrypted form of the known data pattern may serve as the test data pattern and the decrypted form of the known data pattern may be compared to the plaintext format of the known data pattern. In this manner, if the receiver obtains an encryption key that decrypts the encrypted KDP such that the decrypted KDP is the same as the known data pattern, the receiver may be assured that the sender of the encryption key is who or what they proport to be and can be trusted for other interactions/communications.

A known data pattern may comprise any set of data in any format (binary, text, etc.) including any content including symbols, images, icons, pictures, a binary large object (BLOB), text, characters, numbers, or the like. In one embodiment, the known data pattern comprises a sentence such as "This is your known data pattern, protect it.". In another embodiment, the known data pattern comprises a paragraph, or an image, or a serial number, or a manufacturer's name or address, or the like.

In some embodiments, the plaintext KDP 330 and encrypted KDP 332 may be stored in the mask ROM 314 (e.g., one-time programmable (OTP) memory) of the controller 600, rather than the non-volatile memory 316. In such embodiments, the processing may be simplified, and the cost reduced, because an RSA key engine, such as cryptography engine 604, may not be needed, and the KDP may not be modified.

In some embodiments, the host 304 may send a firmware image update prompt 336 to the storage device 302 when an updated firmware image is available for the storage device 302 to download. "Firmware image update prompt" refers to a message from a host configured to signal to a computing device, such as a storage device, that a firmware image update has been created and is available for the computing device to obtain and install when, or if, the computing device is instructed to do so. In certain embodiments, a firmware image update prompt may be understood to be an invitation to accept and install the firmware image update but not a requirement. In other embodiments, a firmware image update prompt may comprise a requirement and the computing device may be instructed to wait and perform no other functions, or a limited set of functions, until the computing device installs the available firmware image update.

When the storage device 302 receives the firmware image update prompt 336, the storage device 302 may generate an asymmetric key pair, such as public key/private key, i.e., RSA key pair, using the controller 600. The public key 324 and private key 326 may reside in the SRAM 310 during the disclosed download/update process. "Public key" refers to an encryption (aka cryptographic) key used in a public key encryption process. Generally, the public key is shared with any entity that would like to exchange messages with the owner of the public key using a public key encryption process. "Private key" refers to an encryption (aka cryptographic) key used in a public key encryption process. Generally, the private key is not shared publicly and is retained by an entity that would like to exchange messages with other that use a corresponding public key in a public key encryption process to encrypt information which the holder of the private key decrypts using the private key. Private keys and public keys may exist in pairs since one key is needed to encrypt a message and the corresponding key is needed to decrypt the message encrypted using the other key. Public key/private key pairs may be generated for each communication session or may be generated once and used for a number of communication exchanges.

The SRAM is a type of semiconductor memory that uses bi-stable latching circuitry (flip-flop) to store each bit. In some embodiments, a single key pair may be stored permanently in a secure memory location (e.g., mask ROM 314), rather than generating a new key pair upon request.

The storage device 302 may then initiate a firmware image update 338. The controller 600 may then receive a symmetric key 328 from the host 304 by way of a public key encryption process 400, which is described in more detail in relation to FIG. 4. "Symmetric key" refers to an encryption key that is used both to encrypt a message and to decrypt the message. Without a symmetric key, the encrypted message is unreadable because the computing resources of time, processing power, memory, or other resources are so high that attempts to break the encryption without the symmetric key are of very little value and/or of a very low likelihood of success. A symmetric key is one type of encryption key. The other type of encryption key is an asymmetric key. An asymmetric key uses one encryption to encrypt information and a different corresponding encryption key to decrypt the encrypted information.

The symmetric key may comprise an Advanced Encryption Standard (AES) key having at least 256 bits. "Advanced Encryption Standard (AES) key" refers to a cryptographic key generated using the Advanced Encryption Standard (AES) cryptographic algorithm, which is a block cipher. An Advanced Encryption Standard (AES) key may be referred to as an AES key. An Advanced Encryption Standard (AES) key is a symmetric key and may be generated in conformance with a variety of key lengths including 128-bit, 192 bit, or 256 bit. The controller 600 may then decrypt the encrypted symmetric key received from the host 304 using the private key 326, of the public key/private key pair, and use the decrypted symmetric key to decrypt the encrypted KDP 332.

If the encrypted KDP 332 successfully decrypts using the symmetric key 328, the decrypted KDP will match (be exactly the same) as the plaintext KDP 330. The controller 600 accesses the encrypted KDP 332 and plaintext KDP 330 and uses the symmetric key 328 to determine if the KDP is the same between the plaintext KDP 330 and the decrypted KDP. If so, the controller 600 determines that the symmetric key 328 is a valid key from a trustworthy source. This determination is referred to herein as a validation. When the storage device 302 validates the host 304, by way of the KDP, symmetric key 328, and public key encryption process, the storage device 302 is prepared to accept a firmware image update 334 for this particular host 304. If the controller 600 determines that the plaintext KDP 330 and the decrypted KDP do not match, then the controller 600 deems the symmetric key 328 invalid.

In one embodiment, when the controller 600 validates the symmetric key 328, the storage device 302 may then signal the host 304 to initiate the firmware download. In another embodiment, the host 304 may send a first packet of the firmware image update 334 with the symmetric key 328. In such an embodiment, the controller 600 may acknowledge the first packet and accept additional packets until the whole firmware image update 334 is downloaded. In another embodiment, the host 304 may not send packets of the firmware image update 334 until the controller 600 acknowledges that the controller 600 is prepared to accept the firmware image update 334.

In certain embodiments, the host 304 and storage device 302 may conduct the download of the firmware image update 334 using a secure communication channel according to a protocol such as File Transfer Protocol Secure (FTPS), Hyper-Text Transfer Protocol Secure (HTTPS), and the like. In such an embodiment, communication modules on the host 304 and storage device 302 may provide a layer of encryption to protect packets that are transferred.

In another embodiment, the host 304 may add another layer of security. In such an embodiment, the host 304 may encrypt each packet of the firmware image update packets 340 using the validated symmetric key 328. Accordingly, the storage device 302 uses the symmetric key 328 to decrypt each packet at the storage device 302. In embodiments for which the firmware image update is encrypted using the symmetric key when the firmware image is created/generated, this added layer of security may result in packets of the firmware image update being encrypted twice using the symmetric key. In such an embodiment, the storage device 302 uses the symmetric key 328 to decrypt each packet at the storage device 302 for both layers of encryption.

Once the download is completed, the storage device 302 may replace its current firmware image 320 with the firmware image update 334 sent via this secure process.

Alternatively, if the controller 600 determines that the plaintext KDP 330 and the decrypted KDP do not match, then the controller 600 deems the symmetric key 328 invalid and/or the host 304 untrustworthy. The controller 600 rejects the firmware image update prompt 336 from the host 304. In one embodiment, the controller 600 may simply ignore the firmware image update prompt 336. In another embodiment, the controller 600 may log details about the firmware image update prompt 336 for subsequent review and analysis. In another embodiment, the controller 600 may report receipt of the firmware image update prompt 336 and relevant details about the host 304 for subsequent review and remedial action. Because the firmware image update 334, using the disclosed solutions, is validated before being downloaded, there is no need to perform firmware image validation steps at boot up, allowing faster boot times.

In the embodiment of FIG. 3, the SRAM 310 of the storage device 302 controller 600 is shown storing the public key 324 and private key 326 used during the public key encryption process 400, as well as the symmetric key 328 sent by the host 304. These keys may reside in the SRAM 310 only temporarily for an enhanced level of security and protection. The keys may stay in SRAM 310 for only as long as they are needed to implement one or more methods of the claim solution.

In other embodiments, enhanced levels of security may be traded for reduced complexity, component costs, and processing requirements. For example, one or more of the keys (e.g., public key 324, private key 326, and/or symmetric key 328) may be stored more permanently in secure memory locations within the storage device 302, such as the mask ROM 314.

The bootloader 312 loads a firmware image, such as current firmware image 320, when the storage device 302 first boots up, is powered on or reset. If the download and update of the current firmware image 320 is successful and the firmware image update originates from a trustworthy host 304, the current firmware image 320 is replaced by the firmware image update 334 and the firmware image update 334 will be booted by the bootloader 312 the next time the storage device 302 starts up or is reset.

In some embodiments, the storage device 302 may comprise a bootloader 312 with an added level of protection against malicious firmware images. In such an embodiment, the bootloader 312 may be configured to only boot the storage device 302 when the layout of the firmware image satisfies a recognized verification data pattern. The verification data pattern is described in more detail with regard to FIG. 5.

The bootloader 312 may in some embodiments be configured to boot a second firmware image, such as the restore firmware image 322 when the bootloader 312 determines that the current or updated firmware image layout fails to satisfy the recognized verification data pattern.

"Firmware image layout" refers to a predefined organization and/or design for the format, encoding, data type, and organization of each of the parts of data that make up a firmware image. In certain embodiments, the firmware image layout may define a firmware image as having a header, a body (such as firmware code), a footer, and firmware metadata. The firmware image layout may also include details about which bits, bytes, words, or sets of bits, bytes, and words will be used to represent information, including executable instructions, stored in a firmware image.

In certain embodiments, the firmware image layout is defined down to specific bits within the data that comprise the firmware image. Consequently, if the data of a firmware image is shifted by as few bits as a single bit, the other bits of the firmware image may be unintelligible and of no use to a computing device reviewing, interpreting, executing, or analyzing the firmware image.

The restore firmware image 322 may be a default image programmed at manufacture and known to be uncompromised. In some embodiments, a validated current firmware image 320 or firmware image update 334 may be stored in a second location and serve as the restore firmware image 322. The restore firmware image 322 may be available for use at any point when the controller 600 determines that a current or new firmware image is compromised.

Figure 4:
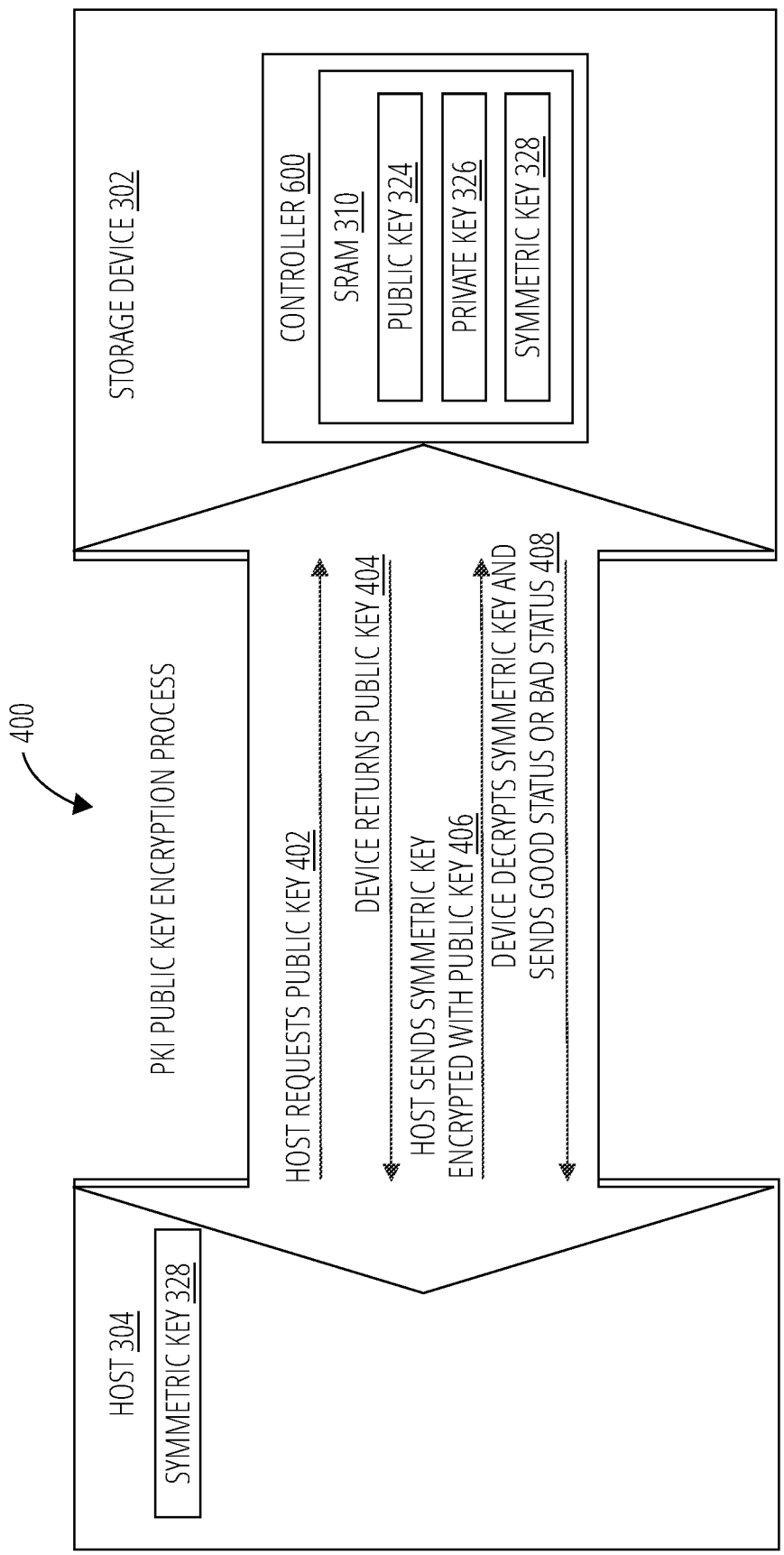
FIG. 4 illustrates a public key encryption process 400 in accordance with one embodiment.

FIG. 4 illustrates a public key encryption process 400 in accordance with one embodiment. "Public key encryption process" refers to a method of encryption that includes use of asymmetric keys, a public key and a private key. In a public key encryption process, one party to a transfer of encrypted information holds the private key and the other party holds the public key that is uniquely associated with the private key. Either party may encrypt a message (such as data) using the encryption key it holds and the other party can decrypt the encrypted message using the corresponding encryption key that the other party holds. A public key encryption process may leverage a public key infrastructure (PKI) and may thus be referred to as PKI. One example of a public key encryption process is Rivest-Shamir-Adleman (RSA).

When the storage device 302 receives the firmware image update prompt 336, the storage device 302 may generate an asymmetric key pair, such as public key/private key, i.e., RSA key pair. In some embodiments, a single key pair may be stored, rather than generating a new key pair in response to each firmware image update prompt 336. Where the same key pair is used, the key pair may not be stored in the SRAM 310 or FLASH memory, but rather in a more secure and permanent storage location, such as the mask ROM 314.

The host 304 may request the public key 324 from the storage device 302 at step 402. The storage device 302 may return the requested public key 324 to the host 304 in step 404. This public key 324 may be uniquely associated with the storage device 302, which also stores the associated newly generated or permanently stored private key 326.

The host 304 may then use the public key 324 to generate an encrypted symmetric key 328, which it may then send to the storage device 302 in step 406. Specifically, the host 304 may use a cryptography engine to encrypt the symmetric key 328 using the public key 324 as the encryption key. The controller 600 of the storage device 302 may be configured to decrypt the symmetric key 328 from the host 304 using the storage device's private key 326. The storage device 302 may determine the validity of the decrypted symmetric key 328 as described with regard to FIG. 3, by using the decrypted symmetric key 328 to decrypt the encrypted KDP 332 and comparing the result with the plaintext KDP 330.

The storage device 302 may as a result of the KDP comparison send a good status (a signal that storage device 302 will accept the firmware image update 334) or bad status (a signal that a data or transmission error occurred or that the storage device 302 will not accept the firmware image update 334) for the symmetric key 328 in step 408. A good status may trigger the host 304 to begin sending the firmware image update 334.

Figure 5:
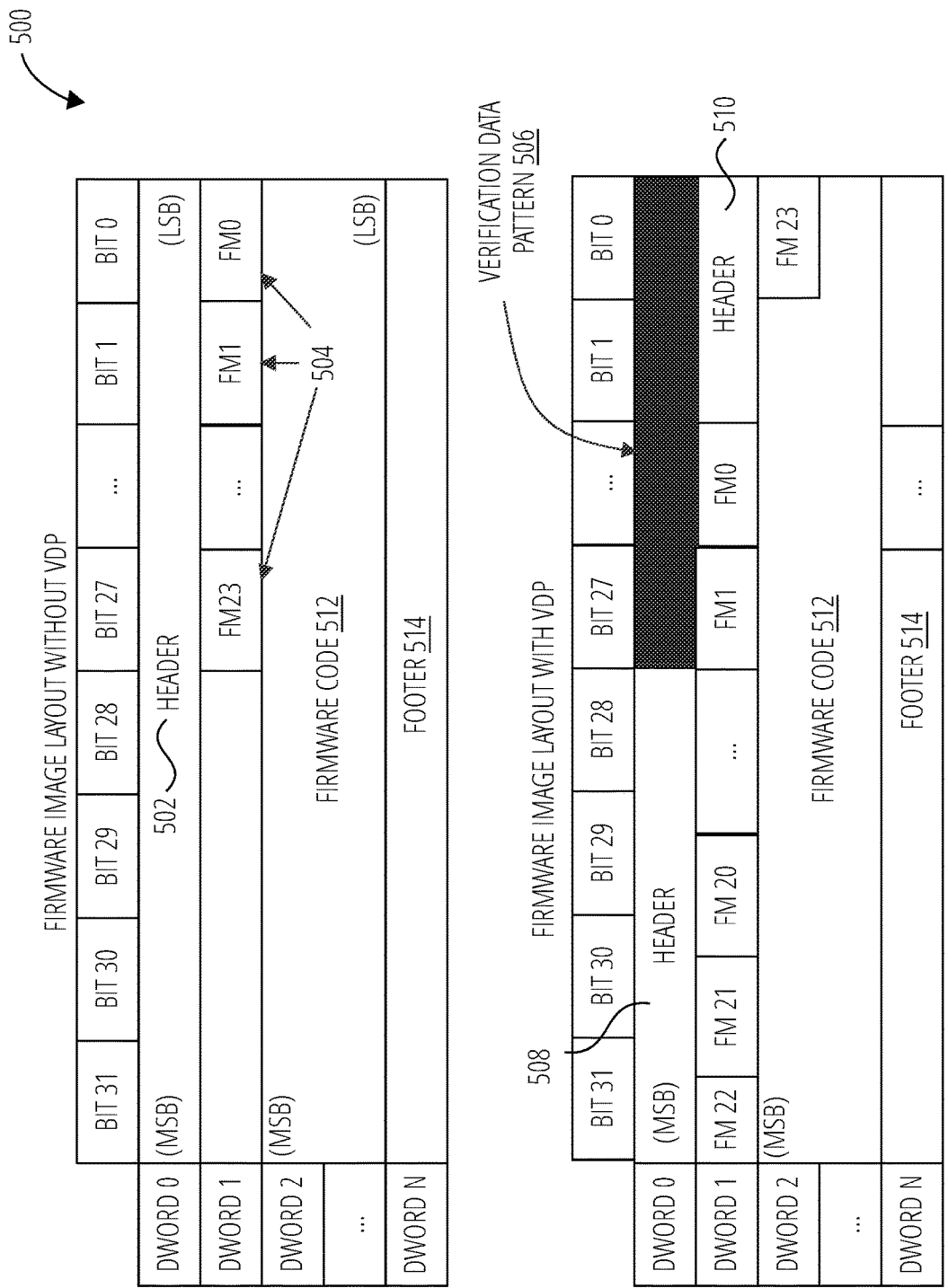
FIG. 5 illustrates a firmware image layout 500 in accordance with one embodiment.

FIG. 5 illustrates an example of a firmware image layout 500. The firmware image layout 500 may include a header 502, firmware metadata, firmware code, and other fields based on the type of storage device the firmware image is installed on. In certain embodiments, the firmware metadata may include security signatures or hash codes to provide security in addition to the security solution disclosed herein. Note that the firmware image layout illustrated in this figure is simplified and for exemplary use and may differ significantly from actual firmware images in use. FIG. 5 is presented to illustrate the concept of a verification data pattern as disclosed herein. "Verification data pattern" refers to a set of data organized into a structure, form, pattern, or set of content such that the data pattern and/or the content may be may be readily reviewed, read, and understood by a computing device reading a firmware image and interpreting the firmware image layout of the firmware image.

A verification data pattern may comprise any set of data in any format (binary, text, etc.) but is generally in a binary format and of a size/length shorter than typical firmware image headers. "Recognized verification data pattern" refers to a verification data pattern that a computing device has reviewed and confirmed that the verification data pattern satisfies the expected size, length, format, and/or content for a verification data pattern that is configured to reside within a firmware image.

The firmware image layout 500 may in some embodiments start at Double Word 0, which includes a header 502. In such a case, a first firmware metadata 504 (FMO) may fill bit 1 of Double Word 0, with additional items of firmware metadata on Bits 1-27 of Double Word 1. This pattern for the header 502 and firmware metadata 504 in the first two Double Words of a firmware image layout may be common enough or be based on a standard such that attempts to hack firmware code may rely on this pattern.

Consequently, in certain embodiments, the firmware image layout is altered and/or obfuscated for an added level of security from a malicious firmware image update. In one embodiment, a verification data pattern 506 is configured to reside in one or more bits of the firmware image layout. In the illustrated embodiment, the bits of the verification data pattern 506 are contiguous, in another embodiment, the bits of the verification data pattern 506 may be distributed throughout the firmware image layout.

In FIG. 5, the top layout illustrates a firmware image layout without a verification data pattern 506. The bottom layout illustrates a firmware image layout with a verification data pattern 506. In the bottom layout, the header 508 has shifted to the left and overflowed to the next Double Word (header 510). By shifting the firmware image layout, the firmware image is obfuscated.

In certain embodiments, the controller 600, is configured to recognize the verification data pattern of the firmware image update. Because the controller 600 understands the position and length of the verification data pattern 506, the controller 600 is configured to recognize the verification data pattern. Because the controller 600 recognizes the verification data pattern, the controller 600 understand where to access the header (e.g., header 508 and header 510), firmware metadata, firmware code 512, and footer 514. In certain embodiments, for an added level of security, the controller 600 may examine the recognized verification data pattern to determine if the content of the recognized verification data pattern matches a predefined set of data, such as a known data pattern.

In one embodiment, the bootloader 312 may check the firmware image for the verification data pattern 506 when booting the storage device 302 and may reject a firmware image update which does not include a recognized verification data pattern.

Figure 6:
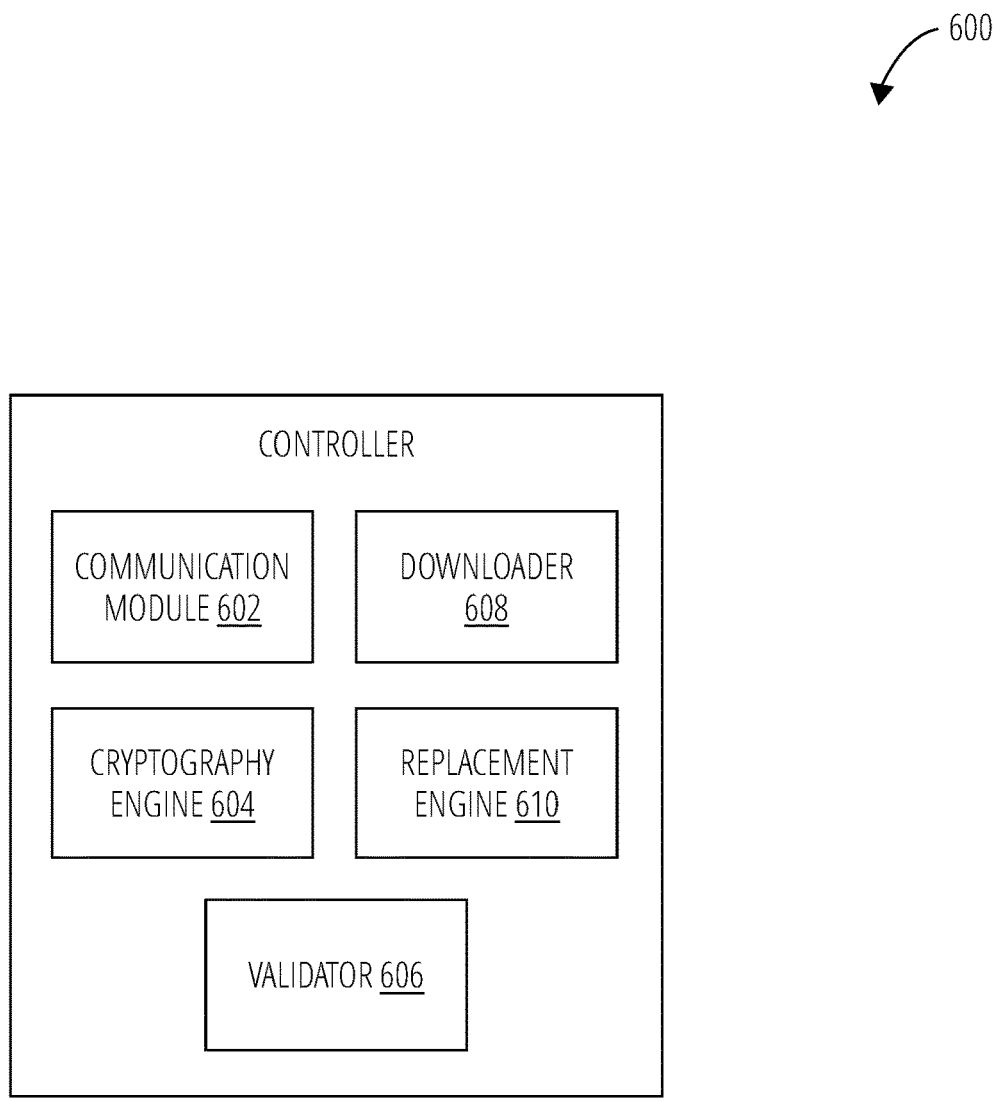
FIG. 6 illustrates a controller 600 in accordance with one embodiment.

FIG. 6 illustrates a controller 600 in accordance with one embodiment. The controller 600 may comprise a communication module 602, a cryptography engine 604, a validator 606, a downloader 608, and a replacement engine 610. These modules may be configured as hardware or logic elements and may allow the controller 600 to perform the functionality disclosed herein.

The communication module 602 manages communications between the host 304 and the storage device 302. This communications may use any of a variety of communication protocols and links (both software and hardware). "Communication module" refers to any hardware, software, firmware, circuit, electronic component, module, logic, device, or apparatus configured, programmed, designed, arranged, or engineered to manage, direct, and/or control analog or digital communications between two electronic components. A communication module may use a variety of signal transfer media including wired and wireless interconnects (such as Bluetooth, Radio Frequency (RF), or Wi-fi technology (e.g. radio or chip)).

In one embodiment, the communication module 602 manages a secure communication channel. The storage device uses the secure communication channel to obtain the encrypted symmetric key, and optionally, the firmware image update from the host. "Secure communication channel" refers to a set of one or more protocols, software, hardware, and/or firmware components modules or apparatus configured to work together or alone to communicate commands, responses, and/or data between a sending device and a receiving device in a secure manner. In one embodiment, a secure communication channel comprises " . . . a way of transferring data that is resistant to overhearing and tampering." ("Secure channel" Wikipedia. Nov. 2, 2019. Accessed Nov. 12, 2019. https://en.wikipedia.org/wiki/Secure_channel.)

In cryptography, a secure communication channel may include one for which the sender of a message is authenticated and validated. Certain embodiments, employ a secure communication channel between a host and a storage device. There are a variety of methods, protocols, and procedures that may be used to establish a secure communication channel, which may be synchronous or asynchronous. Examples of technologies that may be used to implement a secure communication channel include, but are not limited to, public key Infrastructure (PKI), a public key encryption process, Hypertext Transfer Protocol Secure (HTTPS), File Transfer Protocol Secure (FTPS), and the like.

"Cryptography engine" refers to any firmware, software, hardware, device, component, element, circuitry, or circuit configured to provide computer cryptography functionality including the generation, registration, or accessing of cryptographic keys (e.g., public keys, private keys, public/private key pairs, symmetric keys, asymmetric keys), cryptographic algorithms, and the like. A cryptography engine may be implemented solely in hardware, solely in software, or in a combination of hardware and software and may also be referred to herein as an RSA key engine.

The cryptography engine may be configured to support a variety of cryptographic algorithms for either or both block ciphers and stream ciphers, including but not limited to: Advanced Encryption Standard (AES), Rivest-Shamir-Adleman (RSA), Data Encryption Standard (DES), and the like.

The controller 600 may use the cryptography engine to generate a public key/private key pair, track and manage a public key and/or private key, and the like. The cryptography engine 604 may be configured to support the controller 600 by decrypting encrypted symmetric key sent by the host. The cryptography engine 604 may also decrypt the encrypted KDP and any encrypted firmware image data packets using the decrypted symmetric key.

The validator 606 determines whether a symmetric key is valid. In one embodiment, a symmetric key is valid if the validator 606 confirms that the symmetric key originated from a trustworthy source and is of the expected size and configuration.

The validator 606 communicates with the cryptography engine 604 to access the decrypted KDP. The validator 606 communicates with the non-volatile memory 316 or mask ROM 314 to access the known data pattern, also referred to herein as the plaintext KDP 330. The validator 606 compares the decrypted KDP with the plaintext KDP to determine if they are equal to each other. If they are, then the validator 606 determines that the symmetric key is valid.

Since the same cryptographic algorithm was used to encrypt the KDP (which was stored on the storage device 302 during manufacture) using the symmetric key, and the decrypted KDP matches the plaintext KDP this symmetric key has been sent by a host that can be trusted. In one embodiment, the validator 606 may generate a "good" response, if the validator 606 validates the symmetric key and "bad" response if the symmetric key is not validated. In one embodiment, this "good" or "bad" response is sent to the host. In another embodiment, only a "good" response is sent to the host if the symmetric key is valid and no response is sent of the symmetric key is invalid.

The downloader 608 manages the downloading of a firmware image update. The downloader 608 cooperates with the communication module 602 and cryptography engine 604 and validator 606 to initiate the download, only after the validator 606 has validated the symmetric key. The downloader 608 handles details of the download, including maintaining a communication channel, such as a secure communication channel, handling packet transmission errors, and retries, and the like. In one embodiment, once the download completes the downloader 608 may signal the replacement engine 610 to handle the downloaded (and optionally decrypted) firmware image update.

In embodiments, for which the firmware image update 334 has previously been encrypted using the symmetric key, e.g., AES key. The downloader 608 may cooperate with the cryptography engine 604 to decrypt the encrypted firmware image (either in a whole file format or each packet as it is received).

In one embodiment, the replacement engine 610 manages firmware images such as the current firmware image 320, the restore firmware image 322, and the firmware image update 334. Once a downloaded firmware image update is ready, the replacement engine 610 may organize and/or rearrange and/or configure the non-volatile storage 308 in order to replace a current firmware image with the downloaded firmware image update.

Figure 7:
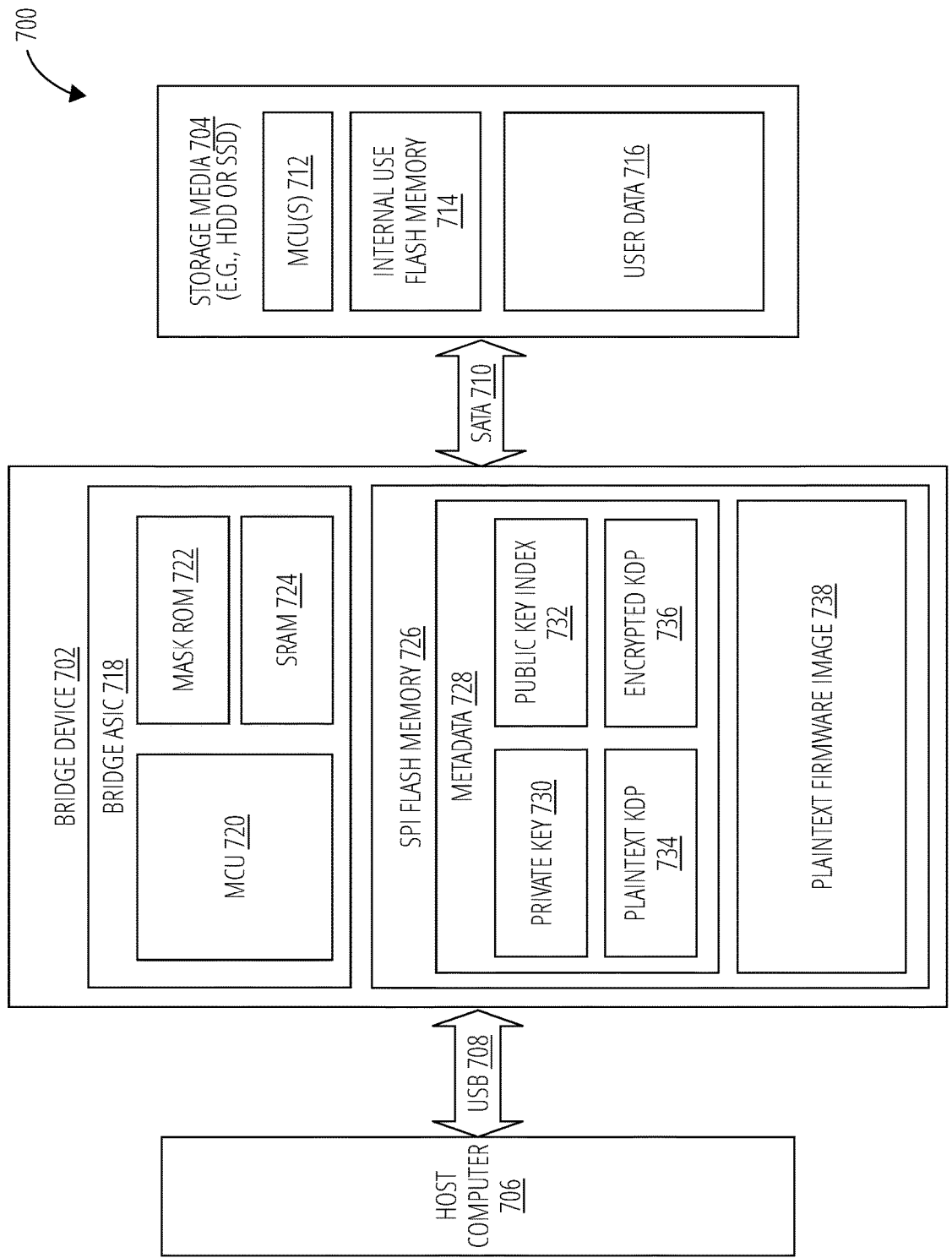
FIG. 7 illustrates a system 700 in accordance with one embodiment.

FIG. 7 illustrates that the solutions described and recited in the claims herein may be used to securely manage firmware image updates for a variety of storage device and/or storage device components. In the embodiment of FIG. 7, a storage device such as a network-attached storage (NAS) device or a direct-attached storage (DAS) device may include a separate control module known in the industry as a bridge device.

The storage device bridge 702 serves to provide certain features such as network attached storage access and/or direct-attached storage access to a host. In certain embodiments, a storage device bridge serves as an intermediary between a host, such as a server or workstation, and a storage resource such as one or more storage devices. In one embodiment, a storage device bridge is configured to serve as direct-attached storage for a server or workstation. In another embodiment, a storage device bridge is configured to serve as network-attached storage for a host or server or workstation connected to the same network as the storage device bridge.

A storage device bridge 702 may include a separate controller, printed circuit board (PCB), and related components to enable a host to access and use certain storage operations with storage media 704, which may be an independent storage device such as an SSD, HDD, or a collection of the same. The storage device bridge 702 may also include a firmware image (just as the storage device 302 included a firmware image) and may need to be updated with a firmware image update over the life of the bridge device.

Referring to FIG. 7, system 700 comprises a host computer 706 that may function as the host to a storage device as described in relation to embodiments, described above. The storage device, in this embodiment, comprises the storage device bridge 702 together with one or more storage media 704. The storage device bridge 702 communicates with the host computer 706 via a USB connection 708 and also in communication with storage media 704 via a storage bus such as a serial ATA connection 710 or PCIe Express or the like. The system 700 may be operated in accordance with the description provided with regard to FIG. 3, FIG. 4, and FIG. 8.

The storage media 704 may include one or more microcontroller units MCU(s) 712, an internal use FLASH memory 714, and user data 716. Logical data block addresses may identify locations of data sectors on a storage media 704. The storage device bridge 702 may include a bridge application-specific integrated circuit 718, or MCU, or FPGA, or processor and a serial peripheral interface FLASH memory 726.

The bridge application-specific integrated circuit 718 may further include a microcontroller unit 720, a mask ROM 722, and an SRAM 724. The serial peripheral interface FLASH memory 726 may further include metadata 728, such as private key 730, a public key index 732, the plaintext KDP 734 disclosed herein, and the encrypted KDP 736, also disclosed herein, as well as a plaintext firmware image 738. In this manner, the storage device bridge 702 and storage media 704 may between them perform the functionality described for the storage device 302 in FIG. 3. Note, however, that in this illustrated embodiment, the firmware image is used to manage and control the behavior of the storage device bridge 702, rather than the storage media 704, whereas this distinction may not be made for a system such as the one illustrated in FIG. 3.

The host computer 706 may provide to the storage device bridge 702 data to be stored on the storage media 704. The host computer 706 may also provide an update of firmware stored on the storage device bridge 702. Furthermore, a power-on signal may be received by the storage device bridge 702 from the host computer 706. Multiple host computers may be coupled to the storage device bridge 702 utilizing multiple USB or other interfaces. The host computer 706 may in some environments be a server device to provide one or more private keys for encryption.

The storage media 704 may be a direct-attached storage device. The storage media 704 may be a hard disk drive (HDD), a solid-state drive (SSD), or other serial ATA devices. The MCU(s) 712 of the storage media 704 may direct the operation of the storage media 704. The MCU(s) 712 may operate the internal use FLASH memory 714, the user data 716, and other memory, arithmetic, and logic unit and input and output components in response to the instructions that have been received by the MCU(s) 712. The internal use FLASH memory 714 may be an electronic (solid-state) non-volatile computer storage medium that may be electrically erased and reprogrammed. The internal use FLASH memory 714 may store data received from the host computer 706 via the storage device bridge 702. The user data 716 utilizes logical block addressing (LBA), or other schemes, to specify the location of blocks (or sectors) of data stored on the storage media 704.

The storage device bridge 702 may send and receive data from each of the host computer 706 and the storage media 704. The storage device bridge 702 may include boot loader logic. "Boot loader logic" refers to executable instructions for a bootloader that direct the bootloader how to perform a booting operation.

The boot loader logic may be stored in the mask ROM 722 of the bridge application-specific integrated circuit 718. The mask ROM 722 is a type of read-only memory (ROM) whose contents are programmed by the integrated circuit manufacturer. The mask ROM 722 is not intended to be programmed by an end-user (such as an attacker). The mask ROM 722 may further comprise the public key index 732 utilized to decrypt the encrypted symmetric key previously described and the plaintext firmware image 738. The plaintext firmware image 738 may be stored in the serial peripheral interface FLASH memory 726 of the storage device bridge 702.

The mask ROM 722 may also comprise the validation steps performed by the validator 606 described in FIG. 6. The validation steps may determine the action taken by the storage device bridge 702 during booting or during a firmware update by, for example, controlling the boot loader logic. This logic may be utilized to determine the application of the PKI process to the symmetric key provided by the host computer 706. The validation steps may be stored in other locations not on the storage device bridge 702, such as the host computer 706 or the storage media 704. The storage device bridge 702 may utilize the plaintext firmware image 738 as well as the mask ROM 722 to securely boot or update firmware for the end-user or a blank FLASH memory device. The validation steps may include logic to apply a public key from the read-only memory to decrypt an encrypted symmetric key into a decrypted symmetric key, logic to apply the symmetric key to decrypt the encrypted KDP in the read-only memory, and to apply the decrypted symmetric key to encrypted firmware image update code blocks. In some embodiments, firmware instructions may also be saved in encrypted and plaintext versions. Validation steps may then include comparing decrypted firmware instructions to the firmware instructions stored as plaintext.

The bridge application-specific integrated circuit 718 may also include the microcontroller unit 720 to control the other components of the bridge application-specific integrated circuit 718. For example, the microcontroller unit 720 may be an 8-bit 8051 device. Data transfer buffers (not shown) may buffer data and commands received from the host computer 706, the storage media 704, or other portions of the storage device bridge 702 until the bridge application-specific integrated circuit 718 processes those data or commands.

The SRAM 724 may temporarily store the public key, private key, and symmetric key needed to validate the firmware image update from the host while this validation is in progress, through these data may be more permanently stored in the mask ROM 722 or other secure memory location. The SRAM 724 may be less than or about 64 KB in some embodiments.

The serial peripheral interface FLASH memory 726 may include the metadata 728 and the plaintext firmware image 738. The serial peripheral interface FLASH memory 726 may be about 256 KB in some embodiments. The metadata 728 may include the private key 730 and the public key index 732. The microcontroller unit 720 uses the private key 730 to decrypt the AES key from the host.

The public key index 732 stores the associations between a private key (which may be stored on a server device, separate from storage device bridge 702 and storage media 704) and the public key used as disclosed herein. Tracking the public key by way of the public key index 732 may be important when validating the symmetric key. The metadata 728 comprises the public key index 732 to direct the microcontroller unit 720 or plaintext firmware image 738 to which of the public keys in serial peripheral interface FLASH memory 726 to use. With a public key index 732, the same public key/private key pair may be used for each firmware image update. Consequently, the storage device bridge 702 may not need to include the hardware and software to generate a new PKI pair with each firmware image update.

Figure 8:
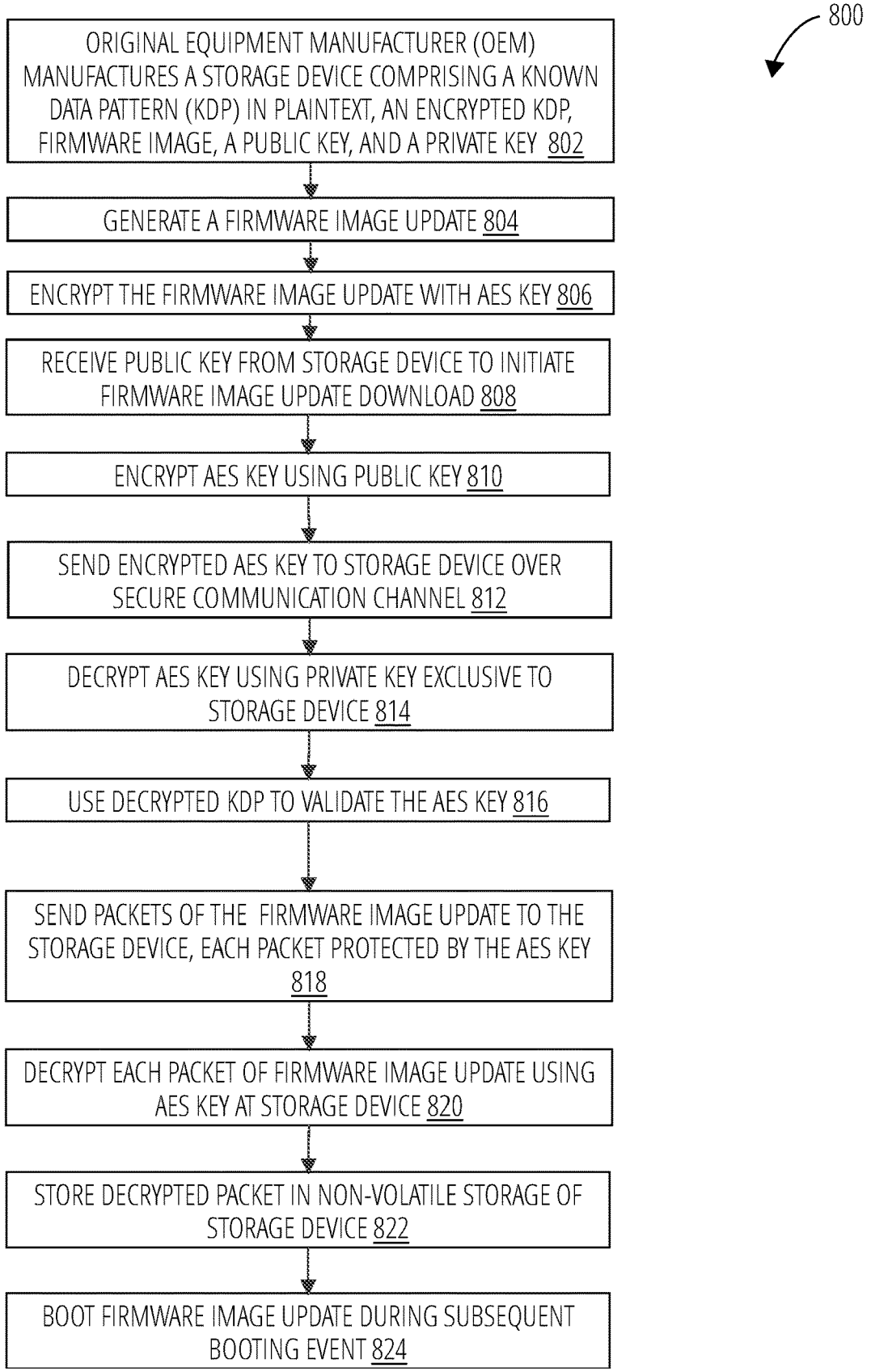
FIG. 8 illustrates a routine 800 in accordance with one embodiment.

As noted above, the system 700 may be operated in accordance with the description provided with regard to FIG. 3, FIG. 4, and FIG. 8 to update the plaintext firmware image 738 with a firmware image update. Once the microcontroller unit 720 or bridge application-specific integrated circuit 718 validates the symmetric key (such as an AES key), the firmware image update is downloaded. In certain embodiments, before terminating a communication session with the host computer 706, the storage device bridge 702 may accept a new encrypted KDP 736. The new encrypted KDP 736 may be encrypted with the same symmetric key and have different content. Alternatively, the new encrypted KDP 736 may be encrypted with a different symmetric key. In this manner, the security protections for firmware image updates may be enhanced because the symmetric key may be changed with each firmware image update. Alternatively, the symmetric key may be changed when a host determines that an old symmetric key has been compromised. The ability to change the symmetric key enhances the security in these embodiments so that a compromised symmetric key does not permanently circumvent the security measures.

FIG. 8 illustrates a routine 800 in accordance with one embodiment. A storage device may be manufactured (block 802) comprising a KDP in plaintext, an encrypted KDP, a public key and private key pair, and a firmware image. The storage device may also be manufactured and include a symmetric key such as an AES key. This AES key may be the key used to encrypt the known data pattern to create the encrypted KDP. In certain embodiments, the same AES key is used to encrypt the firmware image update when the firmware image update is first generated. In certain embodiments, the storage device manufacturer (OEM) or an authorized vendor or supplier may generate (block 804) the firmware update image. Either as part of generating the firmware update image or just subsequent to generating the firmware update image, the manufacturer or vendor or supplier encrypts (block 806) the firmware update image. In certain embodiments, the steps of generating the encrypted firmware update image may be performed by the host. In another embodiment, another computing device may perform these steps and then coordinate with the host such that the host is configured to supply the encrypted firmware update image to the storage device.

In certain embodiments, a firmware image update is initiated by a storage device in response to a firmware image update prompt from a host. Alternatively, the storage device may periodically (or in response to a user command) check with a host to determine whether a firmware image update exists.

In certain embodiments, the method 800 continues and the host may receive (block 808) the public key from the storage device. The host may then encrypt (block 810) an instance of the AES key associated with the host using the public key sent by the storage device. At block 812, the host sends the encrypted AES key to the storage device.

In block 814, the storage device decrypts the AES key using a private key exclusive to the storage device. The storage device then, in block 816, uses the decrypted AES key to decrypt the encrypted KDP and create a decrypted KDP. The storage device may determine the validity of the AES key provided by the host by in comparing the decrypted KDP with the plaintext KDP. The storage device may, in one embodiment, as a result of obtaining a valid AES key, signal the host to proceed with transmission of the firmware image update.

The host may send the firmware image update to the storage device in block 818. This may be achieved by dividing the firmware image update into packets which are sent to the storage device. These packets are encrypted because the firmware update image was encrypted using the AES key when the firmware update image was generated. The storage device may then decrypt each packet of the firmware image update (block 820) using the AES key. The decrypted packets may be stored (block 822) in non-volatile memory or non-volatile storage of the storage device.

In block 824, the storage device may boot the firmware image update during a subsequent booting event. In some embodiments, a new encrypted KDP (updated or revised) may be received by the storage device in response to completing a download of the firmware image update. This new encrypted KDP may replace the KDP previously used by the storage device, in both plaintext and encrypted formats. In some embodiments, where the firmware image layout includes an offset using a recognized verification data pattern, completing a download may cause the storage device to receive a new (modified or revised) verification data pattern. This new verification data pattern may be used to replace the previous recognized verification data pattern.

In one embodiment, a system is provided that supports a secure firmware image update. The system, in one embodiment, includes a means for directing a storage device to receive a symmetric key from a host by way of a public key encryption process, decrypt the encrypted KDP using the symmetric key, validate the symmetric key, and, as a result, download the firmware image update to replace the firmware image in non-volatile storage. The means for directing the storage device, in various embodiments, may include controller 230, controller 600, bridge application-specific integrated circuit 718, microcontroller unit 720, MCU(s) 712, or the like.

In certain embodiments, the storage device may include means for receiving a symmetric key from a host over a secure communication channel and for obtaining a firmware image update from the host, encrypted using the symmetric key. The means for receiving a symmetric key and firmware image update over a secure communication channel, in various embodiments, may include, network-access interface 210, direct-access interface 220, controller 600, communication module 602, bridge application-specific integrated circuit 718, microcontroller unit 720, MCU(s) 712, or the like.

The storage device may further include means for sending the host the public key uniquely associated with the storage device bridge and means for receiving an encrypted symmetric key encrypted by the host using the public key. The means for sending the host the public key and means for receiving an encrypted symmetric key, in various embodiments, may include, network-access interface 210, direct-access interface 220, controller 600, communication module 602, bridge application-specific integrated circuit 718, microcontroller unit 720, MCU(s) 712, or the like.

In certain embodiments, the storage device may include means for decrypting the encrypted symmetric key to obtain the symmetric key, means for decrypting the encrypted KDP using the symmetric key, and means for decrypting the firmware image update in response to validating the symmetric key. The means for this decryption, in various embodiments, may include the cryptography engine 604, controller 600, bridge application-specific integrated circuit 718, microcontroller unit 720, MCU(s) 712, or the like.

In certain embodiments, the storage device may include means for validating the symmetric key in response to the decrypted KDP matching the known data pattern. The means for validation, in various embodiments, may include the validator 606, controller 600, bridge application-specific integrated circuit 718, microcontroller unit 720, MCU(s) 712, or the like. The validator 606 may access the encrypted KDP 332 and plaintext KDP 330, stored in non-volatile memory 316, the mask ROM 314, serial peripheral interface FLASH memory 726, or other secure memory location.

In certain embodiments, the storage device may include means for downloading an encrypted firmware image update in response to validating the symmetric key. The means for downloading and decrypting the firmware image update may be configured reject a firmware image update prompt from the host in response to the decrypted KDP not matching the known data pattern. The means for downloading and decrypting the firmware image update, in various embodiments, may include network-access interface 210, direct-access interface 220, controller 600, communication module 602, the cryptography engine 604, bridge application-specific integrated circuit 718, microcontroller unit 720, MCU(s) 712, or the like. The means for downloading, in certain embodiments, may utilize the downloader 608 working in conjunction with the communication module 602. The downloader 608 may require a signal from the validator 606 to begin a download, and may function in close concert with the cryptography engine 604 in handling encrypted downloads such as the encrypted firmware image update 334.

The storage device may also include means for replacing a firmware image with the firmware image update once the firmware image update is downloaded and decrypted. This may in certain embodiments utilize a replacement engine 610 in communication with the cryptography engine 604 and downloader 608. The means for replacing a firmware image with the firmware image update, in various embodiments, may include controller 600, communication module 602, the cryptography engine 604, replacement engine 610, bridge application-specific integrated circuit 718, microcontroller unit 720, MCU(s) 712, or the like In certain embodiments, the storage device may include means for booting the storage device bridge in response to a firmware image layout satisfying a recognized verification data pattern, as well as means for booting a second firmware image in response to the firmware image layout failing to satisfy the recognized verification data pattern. In various embodiments, the means for booting the storage device bridge may utilize the bootloader 312 in conjunction with the validator 606 in order to validate the firmware image stored in the non-volatile memory 316, and boot using either the current firmware image 320 or the restore firmware image 322 as appropriate. The means for means for booting the storage device bridge in response to a firmware image layout satisfying a recognized verification data pattern and means for booting a second firmware image, in various embodiments, may include bootloader 312, controller 600, communication module 602, the cryptography engine 604, validator 606, bridge application-specific integrated circuit 718, microcontroller unit 720, MCU(s) 712, or the like Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A storage device comprising:
   non-volatile storage comprising:
   a firmware image configured to operate the storage device;
   a known data pattern (KDP) in plaintext;
   an encrypted KDP, wherein the encrypted KDP is encrypted using a symmetric key;
   a public key; and
   a private key exclusive to the storage device; and
   a controller coupled to the non-volatile storage, wherein the controller is configured to:
   send, to a requesting host, the public key to initiate a firmware image update;
   receive, from the requesting host and in connection with the firmware image update, an encrypted symmetric key, wherein the encrypted symmetric key is encrypted by the requesting host using the sent public key;
   decrypt, using the private key, the encrypted symmetric key to generate a received decrypted symmetric key;
   decrypt the encrypted KDP using the received decrypted symmetric key to create a decrypted KDP;
   validate the received decrypted symmetric key in response to the decrypted KDP matching the KDP in plaintext;
   download, from the requesting host, the firmware image update in response to the controller validating the received decrypted symmetric key;
   replace, in the non-volatile storage, the firmware image with the firmware image update; and
   boot, during a subsequent booting event, the firmware image update to operate the storage device.

2. The storage device of claim 1, wherein the encrypted KDP and KDP in plaintext are stored in the non-volatile storage by an Original Equipment Manufacturer (OEM) of the storage device.

3. The storage device of claim 1, wherein:
the requesting host encrypted, prior to download of the firmware image update by the storage device, the firmware image update using the symmetric key; and
the controller is further configured to decrypt, prior to replacing the firmware image with the firmware image update, the firmware image update using the symmetric key.

4. The storage device of claim 1, wherein:
the firmware image update comprises a verification data pattern configured to shift a firmware image layout to obfuscate the firmware image; and
the controller is further configured to:
recognize the verification data pattern in the firmware image update; and
access the firmware image update according to the firmware image layout.

5. The storage device of claim 4, further comprising a bootloader configured to only boot the storage device in response to the firmware image layout satisfying the recognized verification data pattern.

6. The storage device of claim 5, wherein the bootloader is configured to boot a second firmware image in response to the firmware image layout failing to satisfy the recognized verification data pattern.

7. The storage device of claim 1, wherein:
the public key is uniquely associated with the storage device; and
the requesting host generated, prior to sending the encrypted symmetric key, the encrypted symmetric key using the public key.

8. The storage device of claim 1, wherein the controller is further configured to reject a firmware image update prompt from the requesting host in response to the decrypted KDP not matching the known data pattern in plaintext.

9. The storage device of claim 1, wherein the non-volatile storage comprises embedded non-volatile memory and one or more storage media.

10. The storage device of claim 1, wherein the symmetric key comprises an Advanced Encryption Standard (AES) key having at least 256 bits.

11. A storage device bridge comprising: a storage bus coupled to one or more storage media; embedded non-volatile memory comprising: a firmware image; a known data pattern (KDP); an encrypted KDP, wherein the encrypted KDP is encrypted using a symmetric key; a private key; and a public key;
means for sending, to a requesting host, the public key to initiate a firmware image update, means for receiving, from the requesting host and over a secure communication channel, an encrypted symmetric key, wherein the encrypted symmetric key is encrypted by the requesting host using the sent public key, and the firmware image update is encrypted using the symmetric key;
means for decrypting, using the private key, the encrypted symmetric key to generate a received decrypted symmetric key;
means for decrypting the encrypted KDP using the received decrypted symmetric key and validating the received decrypted symmetric key in response to the decrypted KDP matching the known data pattern;
means for downloading and decrypting the firmware image update in response to validating the received decrypted symmetric key;
means for replacing the firmware image with the firmware image update, and
means for booting, during a subsequent booting event, the firmware image update.

12. The storage device bridge of claim 11, wherein:
the host the public key is uniquely associated with the storage device bridge; and
the encrypted symmetric key is encrypted by the requesting host using the public key.

13. The storage device bridge of claim 11, wherein the encrypted KDP and KDP are stored in the embedded non-volatile memory during manufacture of the storage device bridge.

14. The storage device bridge of claim 11, wherein:
the firmware image update comprises a verification data pattern configured to obfuscate the firmware image update; and
the means for booting the firmware image update in the storage device bridge is in response to a firmware image layout of the firmware image update satisfying a recognized verification data pattern.

15. The storage device bridge of claim 14, wherein the means for booting the firmware image update in the storage device bridge is configured to boot a second firmware image in response to the firmware image layout failing to satisfy the recognized verification data pattern.

16. The storage device bridge of claim 11, wherein the means for downloading and decrypting the firmware image update is configured to reject a firmware image update prompt from the requesting host in response to the decrypted KDP not matching the known data pattern.

17. The storage device bridge of claim 11, wherein the symmetric key comprises an Advanced Encryption Standard (AES) key having at least 256 bits.

18. A method comprising: manufacturing a storage device comprising: a known data pattern (KDP); an encrypted KDP, wherein the encrypted KDP is encrypted using an Advanced Encryption Standard (AES) key; a firmware image; and, a public key; generating a firmware image update;
encrypting the firmware image update using the AES key;
based on request from storage device, receiving the public key from the storage device to initiate a firmware image update download;
encrypting the AES key using the received public key;
sending the encrypted AES key to the storage device, wherein the storage device is configured to: decrypt the AES key using a private key exclusive to the storage device to generate a received AES key;
decrypt, using the received decrypted AES key, the encrypted KDP; and
to validate the received decrypted AES key by comparing the decrypted KDP to the KDP in the storage device; and
sending the firmware image update to the storage device by: dividing the firmware image update into packets; and
sending each packet to the storage device, wherein the storage device is further configured to: decrypt each packet of the firmware image update using the decrypted AES key;
store each decrypted packet in non-volatile, storage of the storage device; and
boot the firmware image update during a subsequent booting event.

19. The method of claim 18, further comprising:
receiving, by the storage device, a second known data pattern in response to completing a download of the firmware image update; and replacing, by the storage device, the known data pattern with the second known data pattern.

20. The method of claim 18, further comprising:

receiving, by the storage device, a second verification data pattern in response to completing a download of the firmware image update; and replacing, by the storage device, a recognized verification data pattern with the second verification data pattern.

\* \* \* \* \*